US012067848B2

(12) United States Patent
Berman

(10) Patent No.: US 12,067,848 B2
(45) **Date of Patent: *Aug. 20, 2024**

(54) GAMING DEVICE HAVING GRIDDED-CARD GAME FEATURE

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,562

(22) Filed: Oct. 24, 2022

(65) Prior Publication Data

US 2023/0043388 A1 Feb. 9, 2023

Related U.S. Application Data

(63) Continuation of application No. 17/379,483, filed on Jul. 19, 2021, now Pat. No. 11,482,079, which is a continuation of application No. 16/515,734, filed on Jul. 18, 2019, now Pat. No. 11,069,193, which is a continuation of application No. 14/636,687, filed on Mar. 3, 2015, now Pat. No. 10,360,765.

(60) Provisional application No. 61/947,412, filed on Mar. 3, 2014.

(51) Int. Cl.
*G07F 17/32* (2006.01)
*A63F 3/06* (2006.01)

(52) U.S. Cl.
CPC ............ *G07F 17/3267* (2013.01); *A63F 3/06* (2013.01); *A63F 3/062* (2013.01); *A63F 3/0645* (2013.01); *G07F 17/326* (2013.01); *G07F 17/3262* (2013.01); *G07F 17/3276* (2013.01); *G07F 17/329* (2013.01); *G07F 17/3293* (2013.01)

(58) Field of Classification Search
None
See application file for complete search history.

(56) References Cited

U.S. PATENT DOCUMENTS

| | | | | |
|---|---|---|---|---|
| 5,647,798 | A | 7/1997 | Falciglia | |
| 6,609,973 | B1 | 8/2003 | Weiss | |
| 7,169,046 | B2 | 1/2007 | Webb et al. | |
| 7,455,588 | B2 * | 11/2008 | Webb | G07F 17/32 463/16 |
| 7,959,507 | B2 | 6/2011 | Cannon | |
| 8,197,330 | B2 | 6/2012 | Englman et al. | |
| 8,500,538 | B2 | 8/2013 | Warner et al. | |
| 8,540,562 | B2 | 9/2013 | Roper et al. | |
| 8,585,485 | B2 | 11/2013 | Guinn | |

(Continued)

*Primary Examiner* — Jason T Yen

(57) ABSTRACT

Embodiments of the present invention set forth systems, apparatuses and methods for implementing a card game on a gaming device. Here, gaming devices having a display and game processor may be operable to provide a gaming event using cards with gridded fields. In one type of gaming event, a player may be given one or more cards with a gridded field and compete against one or more other opponents each having one or more competing cards with gridded fields. In another type of gaming event, a player may be given one or more cards with gridded fields and try to match numbers or indicia that are randomly drawn. Play of the gaming event may continue in multiple rounds or stages where a next stage is reached by obtaining a continuation trigger on one or more of the player cards during a present round of the gaming event.

17 Claims, 37 Drawing Sheets

(56) References Cited

U.S. PATENT DOCUMENTS

| | | | | |
|---|---|---|---|---|
| 2004/0009806 | A1 | 1/2004 | Odom | |
| 2005/0059466 | A1 | 3/2005 | Yarbrough | |
| 2006/0084491 | A1 | 4/2006 | DiCarlo et al. | |
| 2007/0167238 | A1 | 7/2007 | Gatto et al. | |
| 2008/0026809 | A1 | 1/2008 | Bozeman | |
| 2008/0254854 | A1* | 10/2008 | Slomiany | G07F 17/32 463/19 |
| 2009/0011814 | A1* | 1/2009 | Lozano | G07F 17/329 463/19 |
| 2009/0075715 | A1 | 3/2009 | Coleman et al. | |
| 2010/0124988 | A1* | 5/2010 | Amos | G07F 17/3283 463/42 |
| 2010/0197385 | A1* | 8/2010 | Aoki | G07F 17/3225 463/31 |
| 2013/0217459 | A1 | 8/2013 | Luciano et al. | |
| 2013/0225270 | A1 | 8/2013 | Kelly et al. | |
| 2013/0244747 | A1 | 9/2013 | Olsen | |
| 2014/0100022 | A1 | 4/2014 | Lewis | |

* cited by examiner

GAMING DEVICE HAVING GRIDDED-CARD GAME FEATURE

RELATED APPLICATIONS

This application is a continuation of U.S. application Ser. No. 17/379,483, filed Jul. 19, 2021, now U.S. Pat. No. 11,482,079, which is a continuation of U.S. application Ser. No. 16/515,734, filed Jul. 18, 2019, now U.S. Pat. No. 11,069,193, which is a continuation of U.S. application Ser. No. 14/636,687, filed Mar. 3, 2015, now U.S. Pat. No. 10,360,765, which claims the benefit of Provisional Patent Application No. 61/947,412, filed on Mar. 3, 2014, to which priority is claimed pursuant to 35 U.S.C. § 119(e) and which is incorporated herein by reference in its entirety.

FIELD OF THE INVENTION

This disclosure relates generally to games, and more particularly to systems, apparatuses and methods for operating a gaming device having a card game.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming" As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate implementing a card game on a gaming device. In some embodiments, this concept is implemented in gaming devices by providing a secondary bonus game using cards having a gridded field. Here, the player may be given one or more cards with a gridded field and compete against one or more other opponents each having one or more competing cards with gridded fields. In other embodiments, a player may be given one or more cards with gridded fields and try to match numbers or indicia that are randomly drawn. In one example embodiment, a method includes receiving a signal to initiate game play, providing first number of cards each having a gridded field, and displaying at least one competing card having a gridded field. When game play is initiated, the method further includes drawing one or more game symbols, determining if the drawn symbol matches a symbol on any of the first number of cards, determining if the drawn symbol matches a symbol on the competing card, and marking any matching symbols on the cards. The method may then determine if an ending condition has been satisfied, continue to draw game symbols and determine matches on any of the cards until the ending condition is satisfied, and determine awards when an ending condition is satisfied.

In other embodiments, similar methods may be implemented in a base game, where a primary or main game played on a gaming device is directed to using cards with gridded fields in a game play area, where results within the gridded field cards are compared against other competing cards having gridded fields to determine awards and game progression processes.

DETAILED DESCRIPTION

Figure 1:
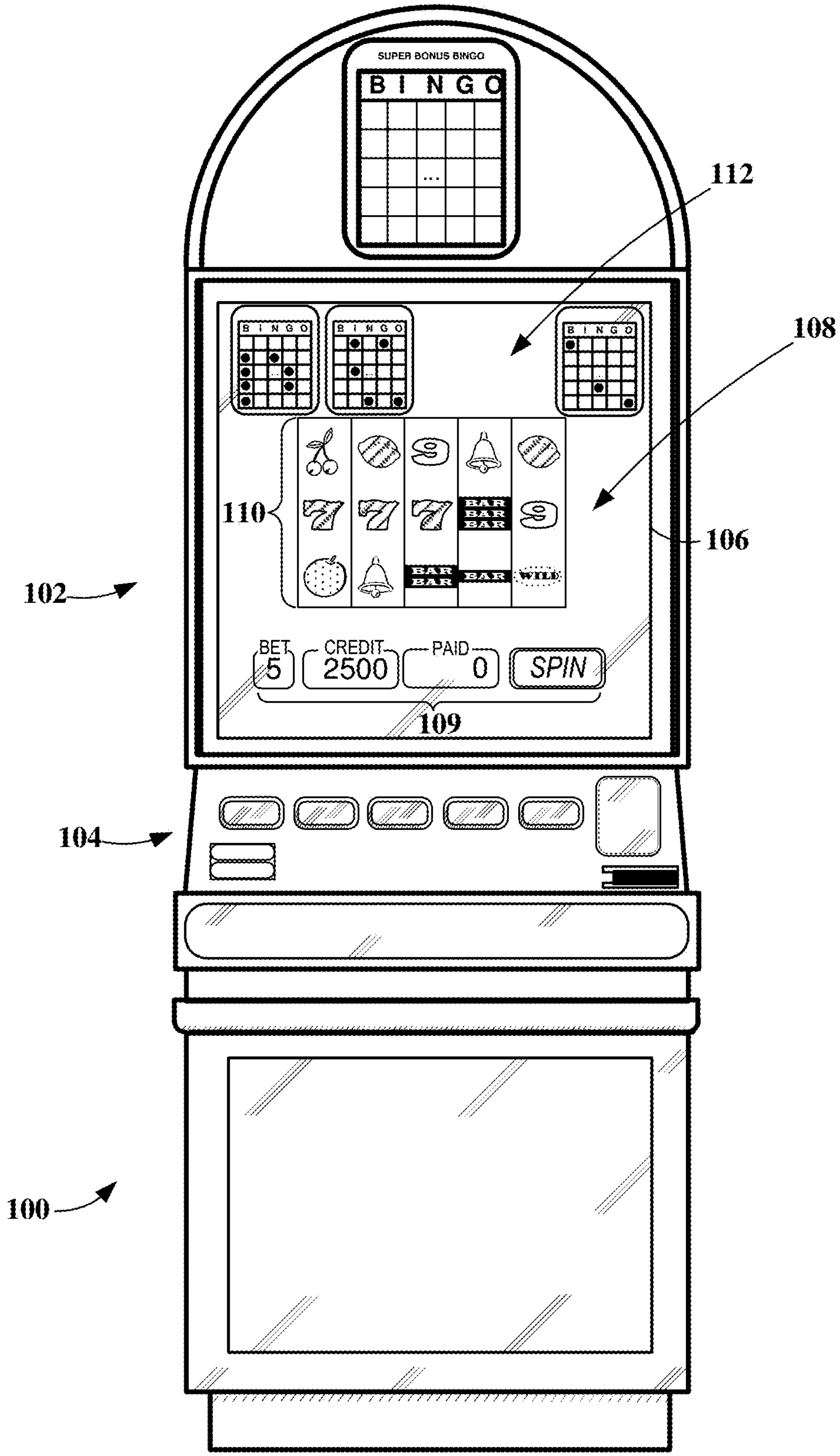
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the term "reels," "cards," "decks," and similar mechanically descriptive language may be used to describe various apparatus presentation features, as well as various actions occurring to those object (e.g., "spin," "draw," "hold," "bet"). Although the present disclosure may be applicable to manual, mechanical, and computerized embodiments, and any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, a symbol can represent values that may at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses, and methods are described for enhancing winning result opportunities in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. slot machine games) are provided for purposes of facilitating an understanding of the features described herein. However, the principles described herein are equally applicable to any game of chance where an outcome(s) is determined for use in the player's gaming activity. The game features described herein may additionally be employed in online games of chance that are played over the Internet or other data network. Here, references to gaming devices includes personal computers, tablets, phones, or other devices that allow player input to play a game of chance.

Various embodiments of the inventive concept are discussed below. Some types of these embodiments are outlined in broad categories relating to styles of game play implementing these types of embodiments, although many other embodiments are possible. Further the embodiments may have features combined from other listed embodiment types or other embodiments not listed. These listed variations may be implemented in any of the embodiments, and other variations are possible.

Draw Until Winner; Next Round for Winning

In these embodiments, a player is provided with one or more cards with gridded playing fields. An opponent is also provided with one or more cards with similar gridded playing fields. The opponent may be a virtual opponent controlled by the gaming device or another controller, or may be another player. Positions within the gridded playing fields are provided with symbols from multiple possible symbols. Symbols are then drawn and matched to the symbols displayed in the positions in the gridded playing fields on the cards, where matched symbols are marked. Symbols are continuously drawn until a winning condition is met on one of the cards. If one of the provided player card(s) is the winning card, the player proceeds to a next round, and the bonus is repeated. If an opponent card is the winning card, the bonus ends.

Draw Until Loser; Next Round as Long as Still Possess Cards

In these embodiments, a player is provided with one or more cards with gridded playing fields. An opponent is also provided with one or more cards with similar gridded playing fields. Positions within the gridded playing fields are provided with symbols from multiple possible symbols. Symbols are then drawn and matched to the symbols displayed in the positions in the gridded playing fields on the cards, where matched symbols are marked. Symbols are continuously drawn until a winning condition is met on all of the cards of the player or all of the cards of the opponent. If the player has one or more losing cards (i.e., a card that does not have a winning condition satisfied when the symbols are no longer drawn), that card is removed from play for the next round of the bonus. If the player does not have any cards remaining for the next round of play, the bonus ends. Alternatively, instead of drawing until a winning condition is met on all cards of the player or all of the cards of the opponent, symbols or items may be drawn until an ending condition is reached.

Draw Fixed Number; Next Round for Condition Met

In these embodiments, a player is provided with one or more cards with gridded playing fields. Positions within the gridded playing fields are provided with symbols from multiple possible symbols. Symbols are then drawn and matched to the symbols displayed in the positions in the gridded playing fields on the cards, where matched symbols are marked. Symbols are continuously drawn until a predefined number of symbols have been drawn. The player proceeds to a next round of bonus play when a continuation condition is met on one of the player's cards. In embodiments where only the player is provided with gridded cards, the player may need to match a specific number of the symbols that have been drawn or have the matched symbols form a predetermined pattern on the one or more gridded cards. In embodiments where an opponent is present, the continuation condition may include having a better result than the opponent after the predefined number of symbols is drawn.

Examples, Other Embodiments, and Variations

As shown below, embodiments of this concept lend themselves to play of Bingo-type games and Keno-type games, as well as other known games that utilize gridded playing fields. The variations and examples below may be combined with one or more of the listed embodiments above, or they may themselves form other embodiments of this concept.

In one example variation, a player is given "x" bingo cards, and an opponent (such as a computer or game processor) is given "y" bingo cards (where "x"–"z"="y", where "z" may be a conditionally based predefined number or a random number). Bingo balls are then called. If one of the player's cards wins first, the player gets to play again in another round. A paytable may be implemented with different pays for different patterns of balls (or bingos).

In another example, there may be a pick screen, where a player picks from a group of icons to see how many cards they get. Alternatively, cards could be randomly picked. The numbers on the cards could be predetermined, random, or otherwise set. A player may be able to select cards they want with number patterns they think are lucky or favorable, or the numbers on the cards could be set, or randomly determined. Players could also pick for the number of cards a computer opponent has, it could be set by the game, or it could be random. In some embodiments, multiple computer opponents may be present. In these embodiments, the player may have to remain above last place or in, for example, the top three to advance to the next bonus round. In other embodiments, the opponents may be other players on a linked gaming system rather than a computer opponent, or there may be a mix of linked-player opponents and computer opponents.

In some embodiments, players could pick to see how many balls they get. Extra balls could also be a pick event for the player in other embodiments.

In another example, a player receives five bingo cards, and a computer opponent gets two bingo cards. Bingo balls are then called or drawn. In some embodiments, bingo balls are drawn until there is a bingo on one of the player's cards, or one of the opponent's cards. In other embodiments, "X" (e.g., 20 or any number) balls are drawn from the pool (typically 75, but could be any sized pool). After 20 balls whoever has the highest bingo advances, or whoever got bingo first advances.

In other variations, while the first card to get a "bingo" may determine the winner, more balls may be dropped to determine at least in part what the award is. These embodiments may allow for additional types of bingo patterns to be possible, which in turn may be associated with different awards. Thus, a player may still get a cover all, a perimeter pattern, an "X" pattern, or another type of bingo pattern. These patterns may be associated with different awards, such as a basic five-in-a-row bingo awarding "5×" of an amount wagered, a perimeter bingo awarding "20×" of an amount wagered, and a cover-all bingo awarding a progressive award. The player may still be able to progress to the next round if they receive the first "regular" bingo (e.g., five in a row), but the additional balls may give the player a chance to improve awards received. In other embodiments, the player may be able to "purchase" or place a side wager to receive additional balls. This side wager may be made up front in some examples, may be made after a winning card is reached, or may be made after a predefined number of balls have been called or drawn. Thus, additional prizes are available, even if the player does not have the first "winning" card to proceed to the next round.

In other embodiments, the winning condition may not necessarily be a "five-in-a-row" bingo. Other patterns on the bingo grid could be winning conditions. Additionally, winning conditions may change or be randomly selected prior to the bingo balls being called or drawn.

As mentioned above in "Draw Until Loser" type of game play, a player may have a losing bingo card removed for a next bonus or game round, where they still proceed to the next bonus or game round as long as they have at least one active or alive bingo card. For example, a player could start with five bingo cards and a compute opponent may start with two cards. Each time one or both of the computer opponent's bingo cards beats one or more of the player's bingo cards, the one or two losing player cards are removed before determining whether a next round is triggered. So, if a player started the bonus with five cards and both computer cards beat at least two of the player's cards, the lowest two player cards would be eliminated and the player would be down to three cards for the next round. Although the player loses two cards in this round, the player's other three cards may have accumulated awards in the bonus. For example, if the first winning card was one of the player's cards, an award may be provided for the first winning "bingo." Additionally, if any of the player's cards matched other bonus patterns before the computer opponent's cards both received a "bingo" (or other winning condition) awards for those bonus patterns may also be provided.

In the next round of this example, suppose one of the player's cards did not receive "bingo" before both of the computer opponent's cards reached the winning condition ("bingo" here), the player would have the losing card removed and have two cards remaining for the third round of the bonus. In the third round, if the both the player's cards failed to get "bingos" before the computer opponent's cards received "bingos," the bonus would end as the player would not have any remaining active or alive cards for the fourth round of play.

Some variations include allowing a player designate a "lucky card" (if there are multiple cards in play) and/or a "lucky spot" on the grid. If the "lucky card" is the winning card (such as, for example, getting a bingo first or getting a bingo at all), or if the "lucky spot" is marked or otherwise activated during a game/bonus event, the player may win additional credits, multipliers, or other awards.

In another embodiment, bingo balls could be called in groups of "X" (e.g., 5 balls are drawn and called) before a continuation condition is evaluated. In one example, the continuation condition may be a condition where one of the group of called balls provides a mark on one of the player's cards. If the continuation condition is met, another group of "X" or "Y" (Y could be a random number, a sequential number, a number based on X, or the same number as X) of balls would be drawn and called. In one variation of this embodiment, the player may have to place a side bet or additional wager for the extra ball draws. This side bet or additional wager may be a fixed amount, or a dynamic pay scale may be implemented where, for example, each group of "X" balls is more expensive, or is variable based on the player's current card situation. As mentioned above, embodiments having this feature may be useful where the player needs extra marked spots to receive an award. The player may be able to pay for each extra ball, up to a predetermined limit. For example, a player may place an additional wager for an extra ball drawn and called up to ten (or any number) extra balls, where the first four extra balls cost "A," the next four extra balls cost "B," and the final two balls each cost "C." At each stage the player can weigh the probability/possibility of an award with the amount required of the additional wager.

This purchase or placed additional wager for extra balls may be useful when coupled with embodiments where various marked patterns on cards pay different amounts. Thus, a player may have secured a lower award pattern initially, but be close to a higher paying pattern. Additional wagers to receive extra drawn and called balls may complete the higher paying pattern.

In yet other embodiments, there may be predefined levels with various patterns available at each of the levels. Levels could be for a given bonus, or could be associated with a particular player and tracked on a player's card or in a player loyalty database.

Although bingo cards are typically 5×5 cards (that is, a grid including five columns and five rows, with a total of 25 grid positions), any style or shape of grid may be used on the cards. Additionally multiple grids may appear on a single card, or a grid may be allocated over two or more cards. In some examples, the cards could include grids of 1×5, 2×5, 3×5, 4×5, 5×5, etc. Other grids may not be rectangular in shape. They may, for example, be hexagonal, octagonal, triangular, circular, oval, diamond, or any other shape, symmetric or non-symmetric. Additionally, large grids (e.g., 25×25) may be made up of two or more sub-grids (e.g., 25 5×5 sub-grids). The grids may have a free space in middle, or may not. Shapes, styles, and layouts of the cards and/or grids could change through the bonus, could be based on a current bonus level, could be based on previous pays achieved, could be random, or could be based on other conditions or criteria.

Additionally, in some embodiments, bonus icons, credit awards, multipliers, or other modifiers may be implemented in a next round of the bonus or game event based on the result of the previous round of the bonus or game event.

The balls drawn and called, may have numbers, letters, colors, shades, multiplier values, credit values, symbols, "Wild" or replacement abilities, "Next Round" promotion ability, or have any other type of marking or indicia on them. When drawn, various features of the drawn ball (or other type of drawn item) can influence if and where it marks a grid, and if and where it is used in the bonus or game event. For example, if the cards showed a partial image and the drawn items were puzzle pieces, the drawn puzzle pieces may be implemented in the partial image to work toward completing the image. In another example, some of the balls may have multiplier values that are used to multiply awards won on a current bonus/game level, on a next bonus/game level, or on a final award for the bonus/game event.

In another example, a player may receive a single card, a predetermined number of balls could be drawn and called, and player may be paid based on a paytable or other award schedule related to the markings on the card. If the player meets a continuation condition (e.g., the player has a card with a pattern associated with an award), the player may proceed to a next level of the game. As mentioned above, in some embodiments, the player may be able to place additional wagers to receive extra balls. As the game progresses, the continuation condition may change so that it is less likely that a player proceeds to the next game level.

Although many of the embodiments discussed above have been couched in terms of a Bingo-style game, similar embodiments and variations are applicable to Keno-style games, or any other games with drawn items and gridded cards used with at least some of the drawn items. In an example Keno embodiment, the player could pick numbers or they could be drawn at random to mark positions on the gridded player keno card. Once the "hopper" balls are drawn, it is determined if the player has one or more of the marked positions associated with the drawn hopper balls. As discussed above, a continuation condition may be used to determine if the player progresses to another round or level of the game. Awards may be based on the number of positions or spots marked by the player, the number of matches with the drawn balls, symbols or indicia on the drawn balls, etc. In some embodiments there could be a volatility choice made by the player based on the number of positions marked, and/or the number of balls drawn. For example, in a "five-spot" keno card, a player may need to match all five marked position with one of the 20 (or any number e.g., 5, 6, 7, 8, 9, 10, etc.) balls drawn to win a top prize, but may only need to match 1 marked spot to continue to a next round.

Numerous other variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of implementing card game techniques in other types of poker games, slot games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes a display portion 102 (also referred to as a gaming display), and a player interface portion 104, although some or all of the user interface 104 may be provided via the display 102 in touch screen embodiments. The display portion 102 may include one or more display areas 106 that may be included in physically separate displays or as portions of a common large display. Here, the game display 106 includes a main game play portion 108 that displays game elements and symbols 110, a secondary game play portion 112 that displays bonus game elements, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and a fixed display information, such as paytable information associated with a glass/plastic panel on the gaming machine 100. The symbols or other indicia associated with the play of the game may be presented on an electronic display device or on mechanical devices associated with a mechanical display. Generally, the display 102 devotes the largest portion of viewable area to the primary gaming portion 108. The gaming portion 108 is generally where the visual feedback for any selected game is provided to the user. The primary gaming portion 108 may render graphical objects such as cards, slot reels, dice, animated characters, and any other gaming visual known in the art. The gaming portion 108 also typically informs players of the outcome of any particular event, including whether the event resulted in a win or loss.

In some example embodiments illustrated herein, the primary gaming portion 108 may display a grid 110 (or equivalent arrangement) displaying some of the elements of slot game reels (or playing cards in video poker embodiments). The secondary gaming portion 112 may show bonus elements used in bonus game events. In other embodiments, a primary gaming portion 108 may be used both to display features of a base game 110 and to display bonus features in a second screen bonus that at least partially replaces the base game features 110 during a bonus gaming event.

The gaming display 106 may include other features known in the art that facilitate gaming, such as status and control portion 109. As is generally known in the art, this portion 109 provides information about current bets, current wins, remaining credits, etc. associated with gaming activities of the gaming portion 108. The control portion 109 may also provide touchscreen controls for facilitating game play. The gaming portion 108 may also include touchscreen features, such as facilitating selection of a portion of multiple displayed gridded cards for play in a gaming event.

Figure 2A:
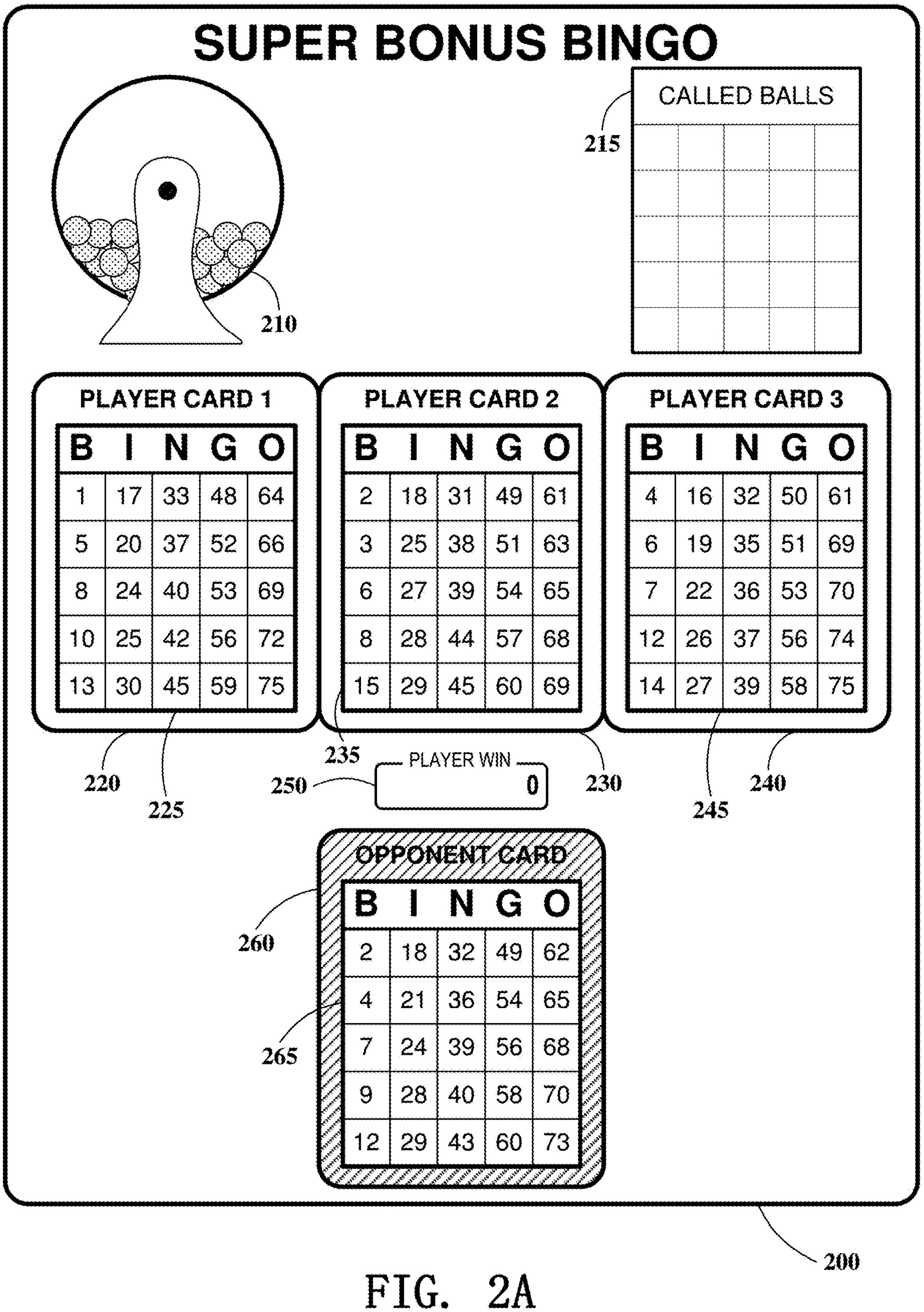
FIGS. 2A, 2B, 2C, 2D, and 2E are diagrams of a gaming display showing a game progression of a gaming event according to embodiments of the invention.

FIGS. 2A, 2B, 2C, 2D, and 2E are diagrams of a gaming display showing a game progression of a gaming event according to embodiments of the invention. Referring to FIG. 2A, a game display 200 includes a first player card 220 with multiple grid positions 225, a second player card 230 with multiple grid positions 235, and a third player card 240 with multiple grid positions 245. Additionally, an opponent card 260 is shown with multiple grid positions 265. In this illustrated embodiment, the player and opponent gridded cards 220, 230, 240, 260 are "Bingo" cards with grids that are five positions high by five positions wide (i.e., a 5×5 grid or matrix). In other embodiments, any type of gridded cards may be used of any size or style. Additionally, while the term "card" is used here to describe an item having a gridded playing area, the item may not graphically or physically resemble a thin piece of paper, cardboard, or board stock. Rather, the term "card" is used to denote an individual play area associated with a grid. Although a single gridded playing area is shown with each card in these embodiments, two or more gridded playing areas may be associated with a single card, or a card may only show a portion of a gridded playing area.

Returning to the display 200 illustrated in FIG. 2A, a player win meter 250, bingo hopper 210, and called ball area 215 are also shown on the display. In operating a gaming device having this game display 200, the illustrated bingo-style game may be played as a primary or base game of the gaming device or may be a bonus game that is played when triggered in addition to a primary slot, poker, or other casino game. For purposes of illustration, the embodiment shown in FIGS. 2A-2E will be discussed in terms of a bonus game. Here, upon triggering of the bonus game event, the player is given the three shown player cards 220, 230, 240, and an opponent card 260 is generated. In some embodiments, the opponent may be another player that is linked to the game play associated with the game display 200 through a game system, game network, Internet, or another game station at a multi-station gaming device. In other embodiments, the opponent may be a computer opponent that is controlled by a local or remote processor.

The numbers shown in the player card grids 225, 235, 245 may be randomly generated for each card, or a player may select the three (or a different number) cards from a screen having multiple possible cards. In other embodiments, the player may be able to select the numbers to form the cards, or may be able to access saved cards from a player account or other source. The numbers on the opponent card grid 265 may be randomly selected, selected according to a predetermined process, or selected by a linked player.

In this illustrated embodiment, the bonus bingo game is operated by randomly drawing balls from the ball hopper 210 and matching the called numbers to the numbers appearing on the player card grids 225, 235, 245, and opponent card grid 265. After a ball is drawn and called, it is displayed in the called ball area 215. Balls are continuously drawn from the ball hopper 210 until at least one of the player cards 220, 230, 240 or opponent card 260 receives a "five-in-a-row bingo." If one of the player cards 220, 230, 240 receives the necessary bingo first, the bonus game event proceeds to another round of bingo play. On the other hand, if the opponent card 260 receives the necessary bingo first, the bonus game event ends. That is, the bonus game event is a multiple round game event where the player has the possibility of playing multiple rounds of bingo to increase potential bonus awards. Although, a "five-in-a-row bingo" is identified as the round ending condition in this embodiment, other types of round ending conditions may be used in other embodiments, such as different grid patterns, a predetermined number of balls being drawn, a special "Round Ending" ball being drawn, or another type of triggering condition occurring. Further, in other embodiments, after a round ending condition occurs, a round may continue with additional balls being drawn if a round-extending criterion is met. A round-extending criterion may include an additional wager or side bet being placed, or a "Round Extender" ball being drawn during normal play of the bonus round. Here, the round may be extended so that a player has the possibility of completing additional grid patterns associated with larger bonus awards. For example, if a bonus round ends when a player (or opponent) receives a five-in-a-row bingo, the player may place an additional wager for five (or another number) extra balls being drawn to extend the round and have the possibility of getting a special bingo pattern (such as a pattern shown in FIGS. 3B-3F or other defined patterns) that are associated with larger bonus awards. Game event or bonus event rounds may be capped at a predetermined number, or may continue as long as a player continues to meet a continuation condition. Continuation conditions may include beating an opponent, receiving a predefined number of matches, receiving a predefined pattern, receiving or not receiving a special drawn item, etc. In other embodiments, the characteristics of the game event or bonus event may change with later rounds or each round. For example, a second opponent card may be added after the fifth round to lower the odds of the player continuing to win and proceed to subsequent game rounds. Similarly, a third opponent card may be added after the tenth round, a fourth opponent card may be added after the fifteenth round, etc.

Figure 2B:
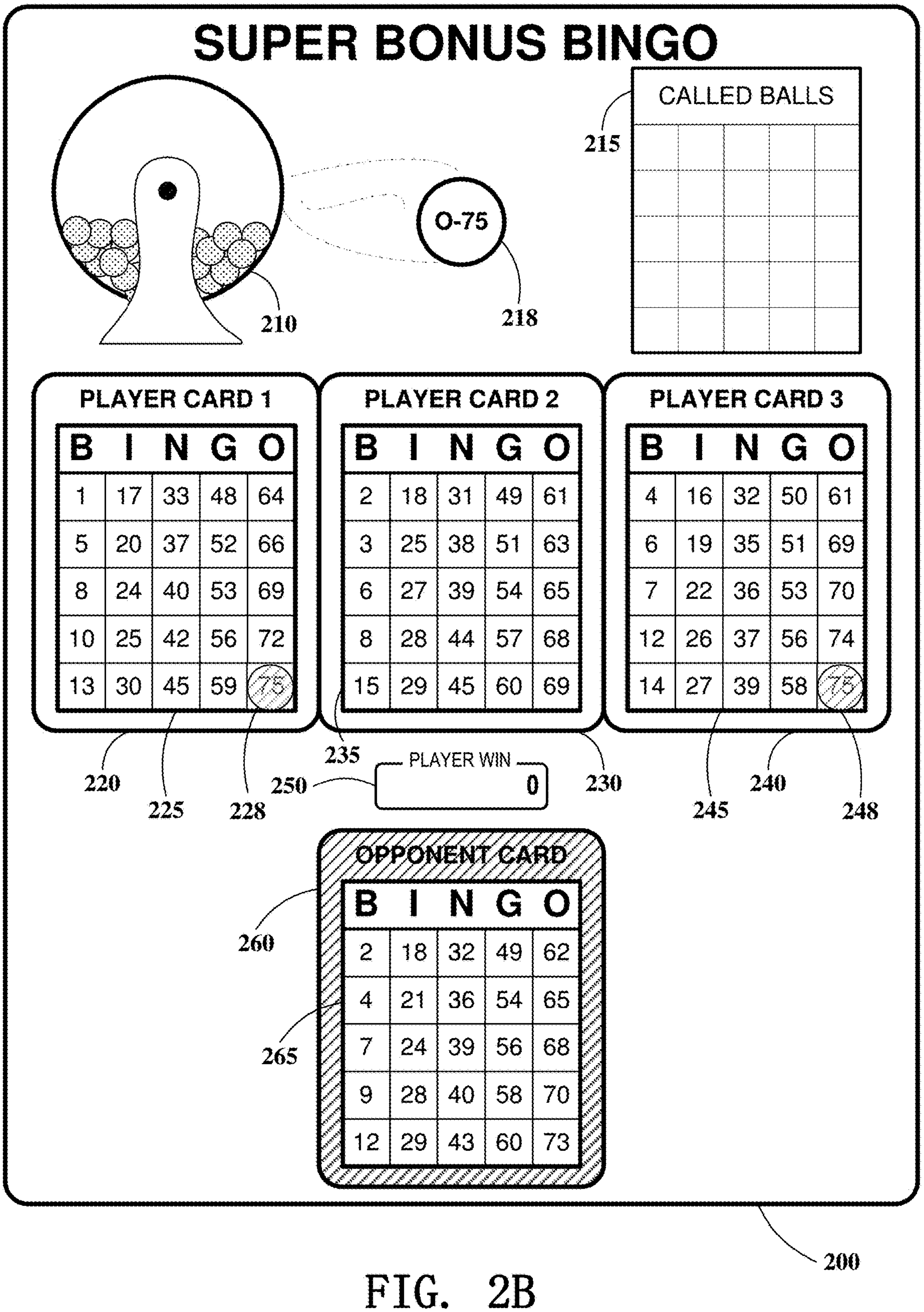

Returning to the illustrated embodiment, FIG. 2A shows a bonus game event that has been triggered where the numbers in each of the player card grids 225, 235, 245, and opponent card grid 265 have been set. In FIG. 2B, a first ball 218 is drawn from the hopper 210 and called. In this case it is "O-75." As the first and third player cards 220, 240 have a matching "O-75" in their respective grids 225, 245, the corresponding grid positions 228, 248 on these cards are marked.

Figure 2C:
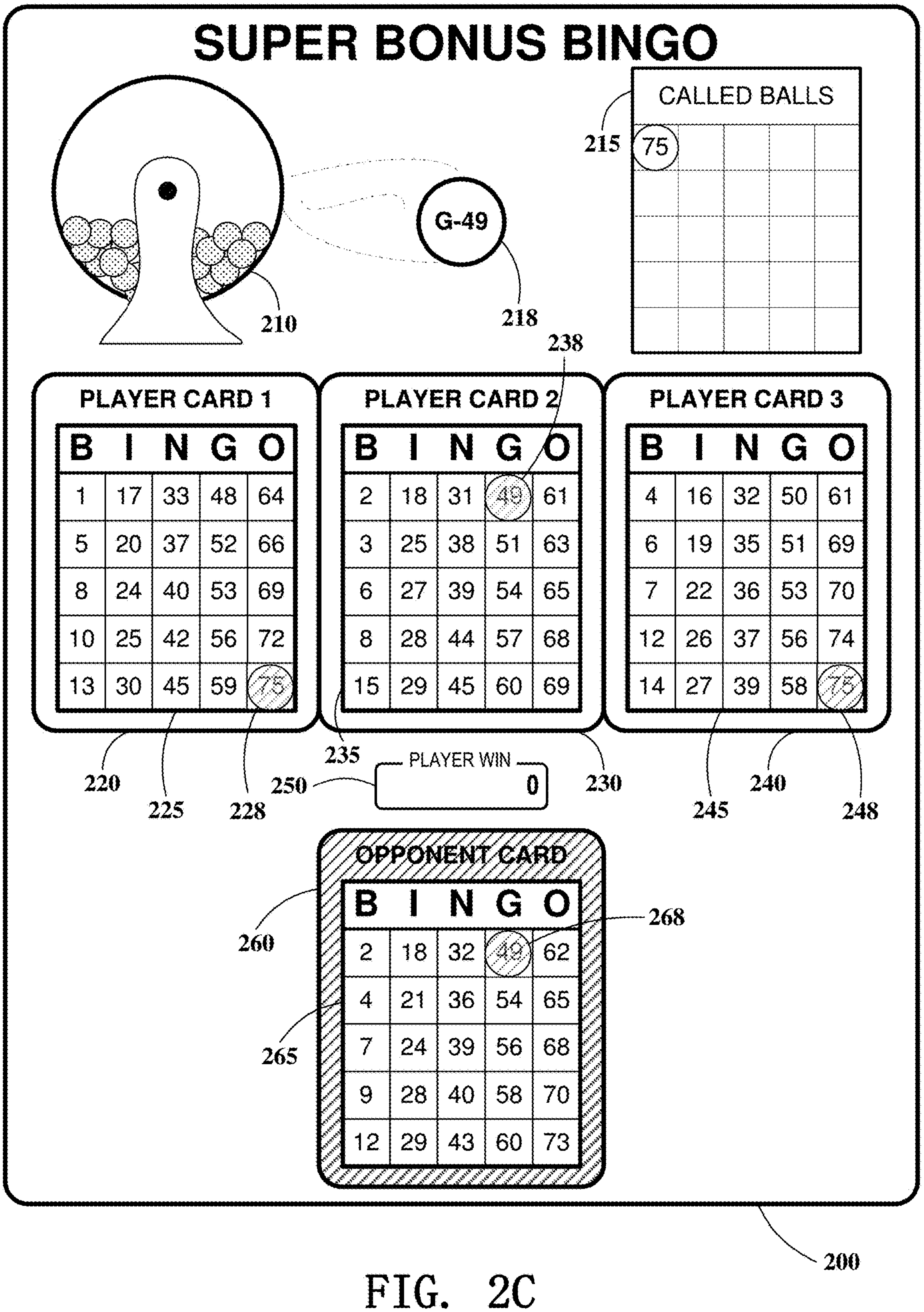
Figure 2D:
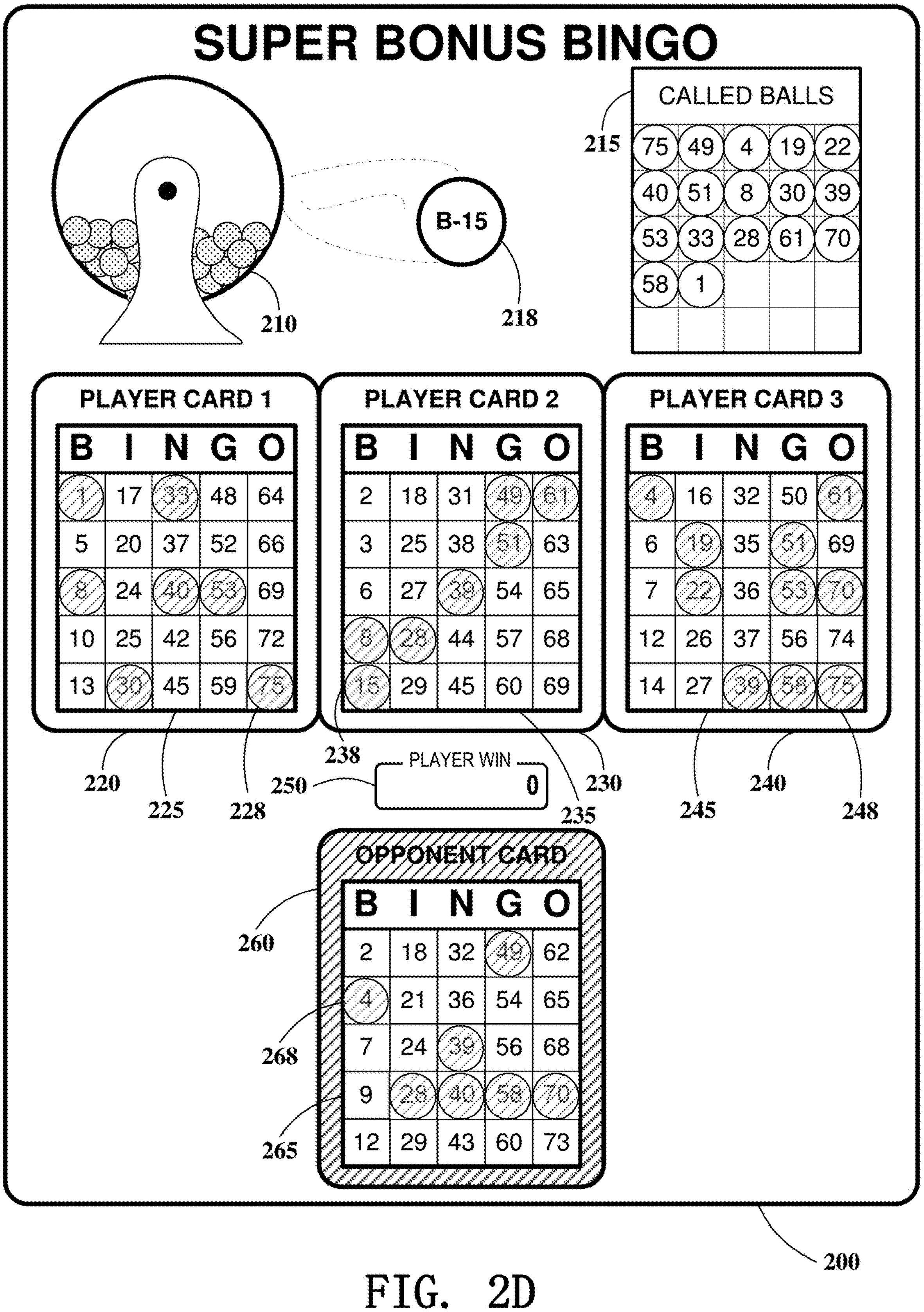
Figure 2E:
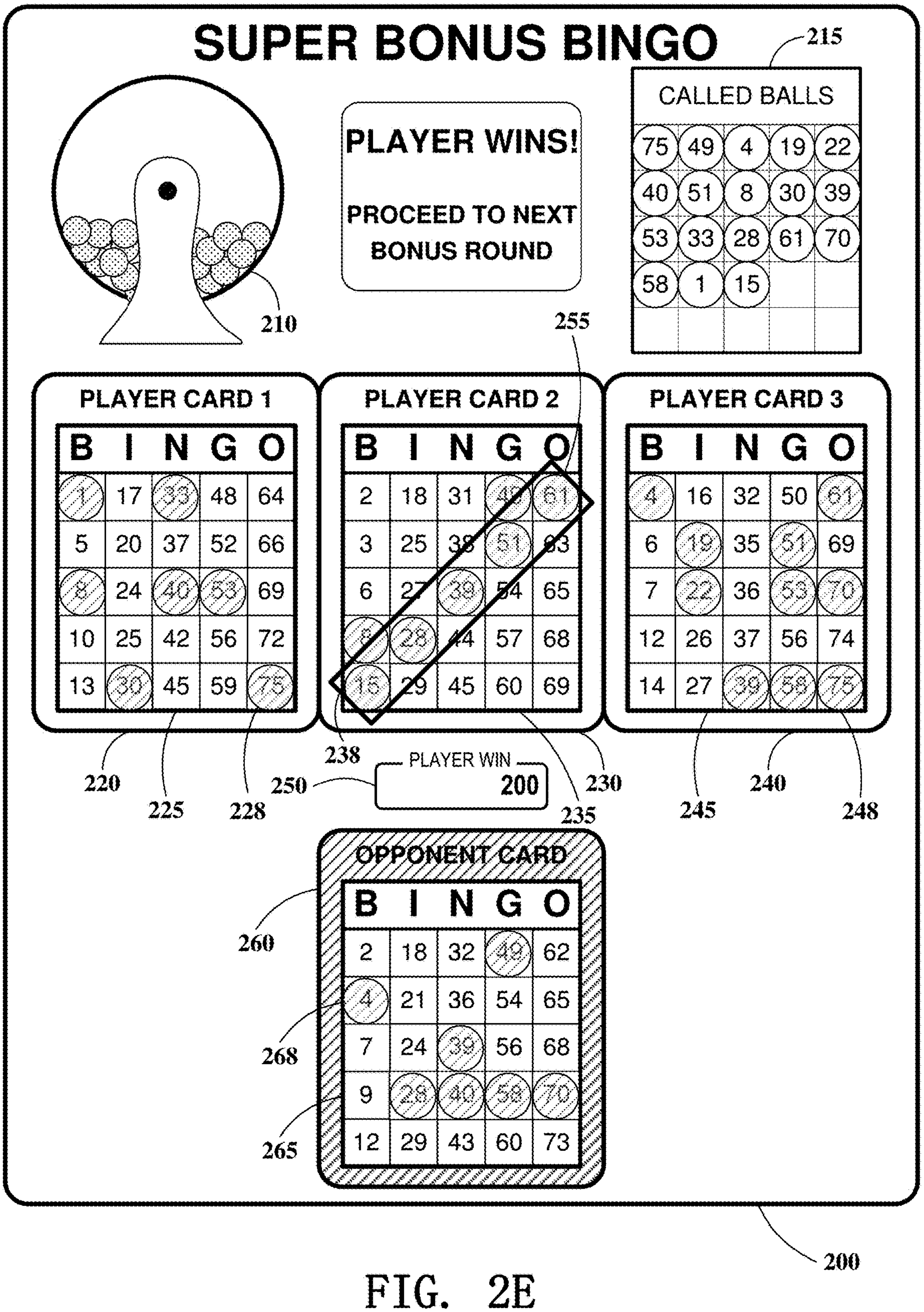

In FIG. 2C, a second ball 218 is drawn from the hopper 210 and called. Matching numbers in the card grids 225, 235, 245, 265 that match this called number are marked. Here, the called ball 218 is "G-49" which matches a card grid position 238 on the second player card grid 235 and matches a card grid position 268 on the opponent card grid 265. FIG. 2D fast forwards this bonus game progression and shows the bonus game event after 17 balls have been called and the second player card 230 receives a five-in-a-row bingo. As shown in FIG. 2E, the five-in-a-row bingo on the second player card 230 is marked 255 to highlight the completion of the five-in-a-row bingo. Since one of the player cards 220, 230, 240 was first to receive a marked bingo 255, the player is awarded 200 credits in the player win meter 250, and the bonus game event proceeds to the next round of the bonus.

In the next round of the bonus, the same player and opponent cards may be used, or new cards may be selected or randomly assigned. As described above, in some embodiments, the player may extend the current bonus round by, for example, placing an additional wager for five extra balls to be drawn. Here, the player may place an extra wager of 20 credits in hopes of drawing two more numbers to complete another five-in-a-row bingo on the first, second, or third player cards 220, 230, 240 worth another 200 credits, drawing a "B-14" to complete a "4 Corners" pattern on the third player card 240 worth 100 credits, or completing another predefined pattern worth additional credits. Since the player has already "won" the round, additional markings on the opponent card may or may not affect any extra awards won during the extension of the bonus round. In some embodiments, if a player wins consecutive rounds with the same card, the player may be given a multiplier for awards won on a current round, on a subsequent round, or for the entire game/bonus event.

Figure 3A:
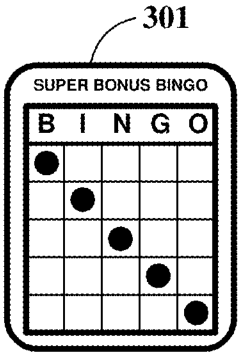
FIGS. 3A, 3B, 3C, 3D, 3E, 3F, 3G, and 3H are diagrams of various grid patterns and grid layouts according to embodiments of the invention.
Figure 3B:
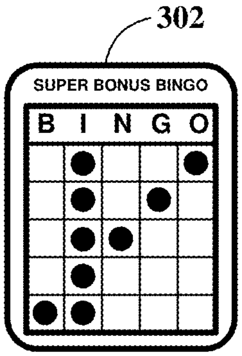
Figure 3C:
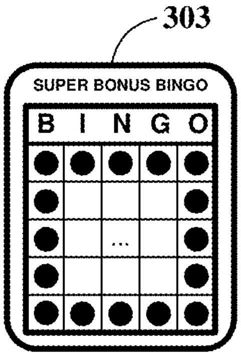
Figure 3D:
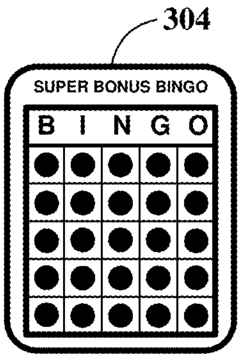
Figure 3E:
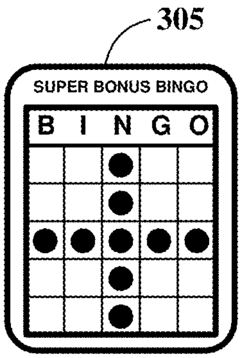
Figure 3F:
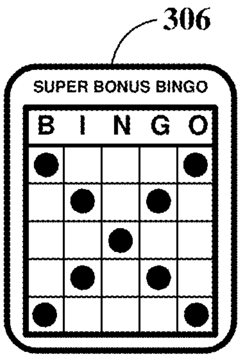
Figure 3G:
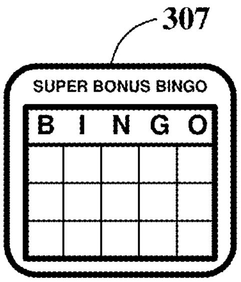
Figure 3H:
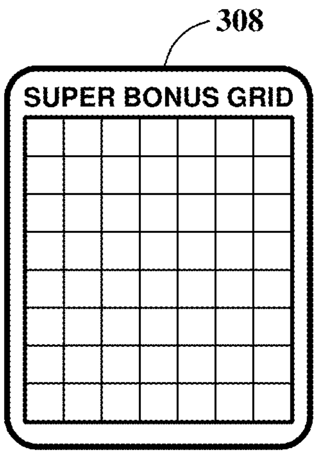

FIGS. 3A, 3B, 3C, 3D, 3E, 3F, 3G, and 3H are diagrams of various grid patterns and grid layouts according to embodiments of the invention. Referring to FIGS. 3A-3F, example grid patterns are shown relating to types of "bingos." In display 301 an example five-in-a-row pattern is shown on a diagonal. Typically five-in-a-row awards can be won for any line of five markings in a column, a row, or along either corner-to-corner diagonal. The middle position of the bingo cards may be "free space" or may have a number associated with it. If the middle position is a "free space" it may be automatically marked without a specific ball or number being drawn. Although it is typically the middle position of bingo cards that is associated with a "free space," in other embodiments one or more other grid positions may be associated with a "free space." In display 302 an example is shown with multiple (here two) five-in-a-row bingos. In display 303 a perimeter pattern is shown. In display 304 a "cover-all" or "black-out" pattern is shown. In display 305, a "+" or plus sign pattern is shown. In display 306, a "X" pattern is shown. Although not shown, many other types of patterns are possible, such as an "L" pattern, a "four corners" pattern, etc. Referring to FIGS. 3G and 3H, displays 307 and 308 illustrate that any sized or shaped grid may be used.

Figure 4A:
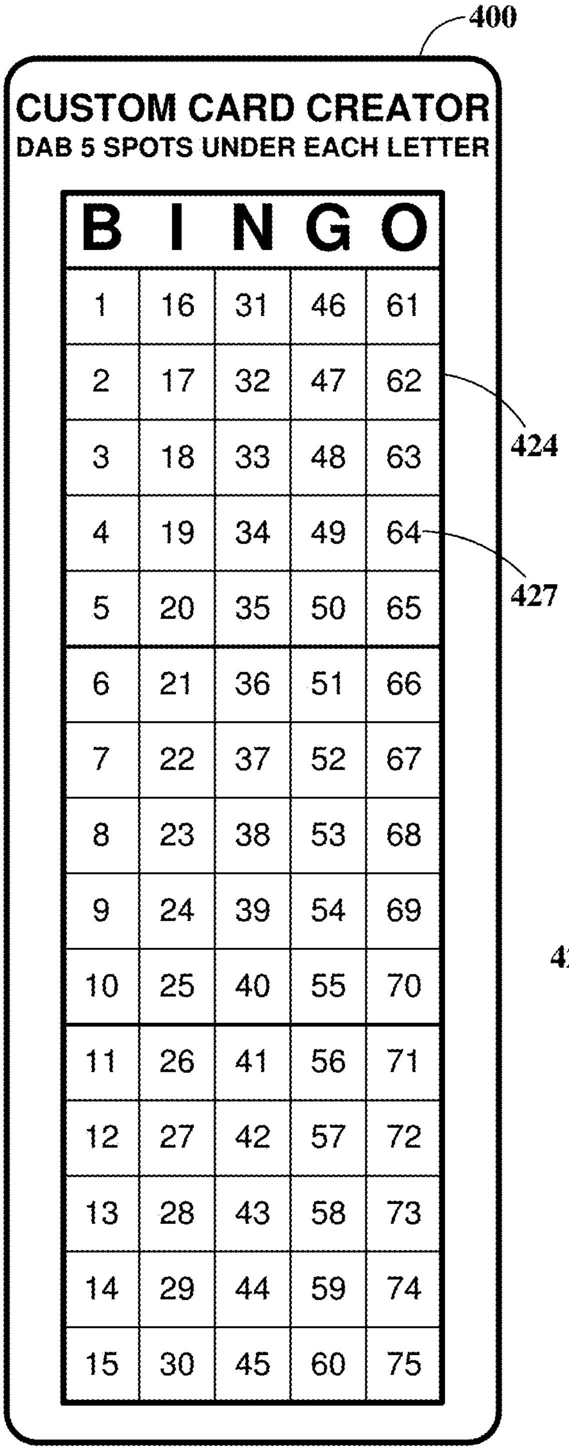
FIGS. 4A, 4B, and 4C are diagrams of a grid selection process according to embodiments of the invention.
Figure 4B:
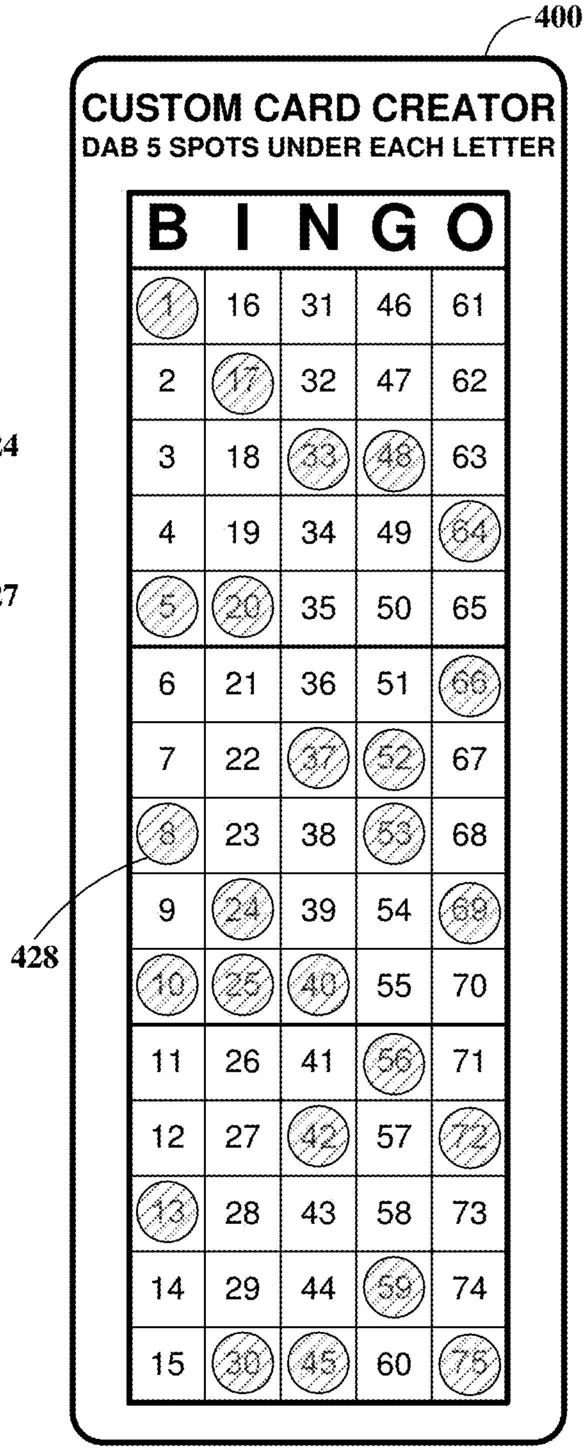
Figure 4C:
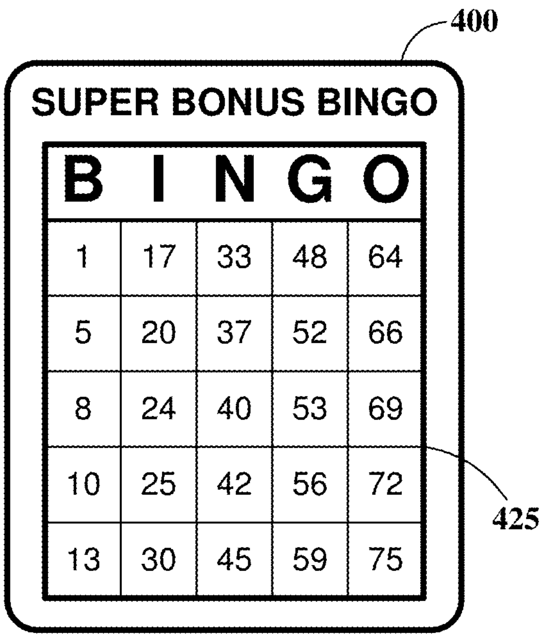

FIGS. 4A, 4B, and 4C are diagrams of a grid selection process according to embodiments of the invention. A grid selection process may be used by a player to customize one or more bingo cards used for play in a bingo game event or bingo bonus game event. This selection process may be offered before the start of a bingo game event. In some embodiments, this selection process may only be available to a certain group of players, such as those wagering at a predefined rate or average amount, those belonging to player loyalty club, etc. In other embodiments, this selection process may be completed by players prior to playing a gaming device and saved to a player account or other storage medium. For example, a player may be able to use a computer, phone, tablet, or kiosk to set up preferred bingo cards prior to playing a gaming device having a bingo game event. Referring to FIG. 4A, a grid 424 is shown on a display 400 having all available bingo numbers 427. A player may then select or mark five numbers 428 from each column, as shown in FIG. 4B, to generate a custom bingo card 425, as shown in FIG. 4C. This selection process may be repeated for additional bingo cards. Additionally, a player may use a similar process or edit or change any saved custom bingo cards.

Figure 5A:
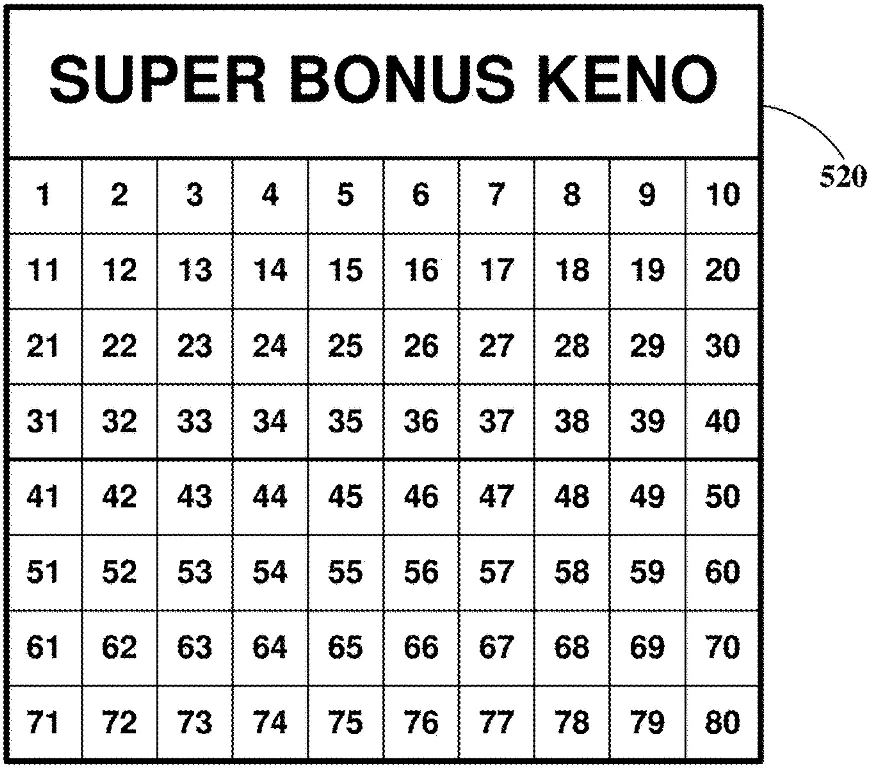
FIGS. 5A, 5B, and 5C are diagrams of a game progression involving a gridded card according to embodiments of the invention.
Figure 5B:
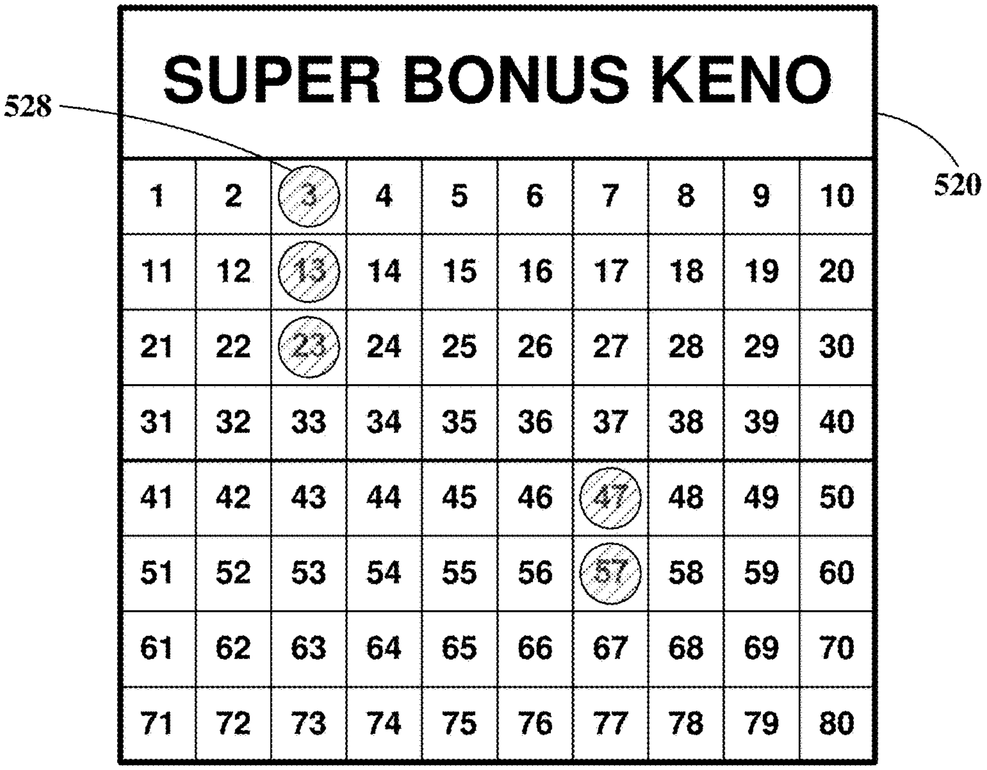
Figure 5C:
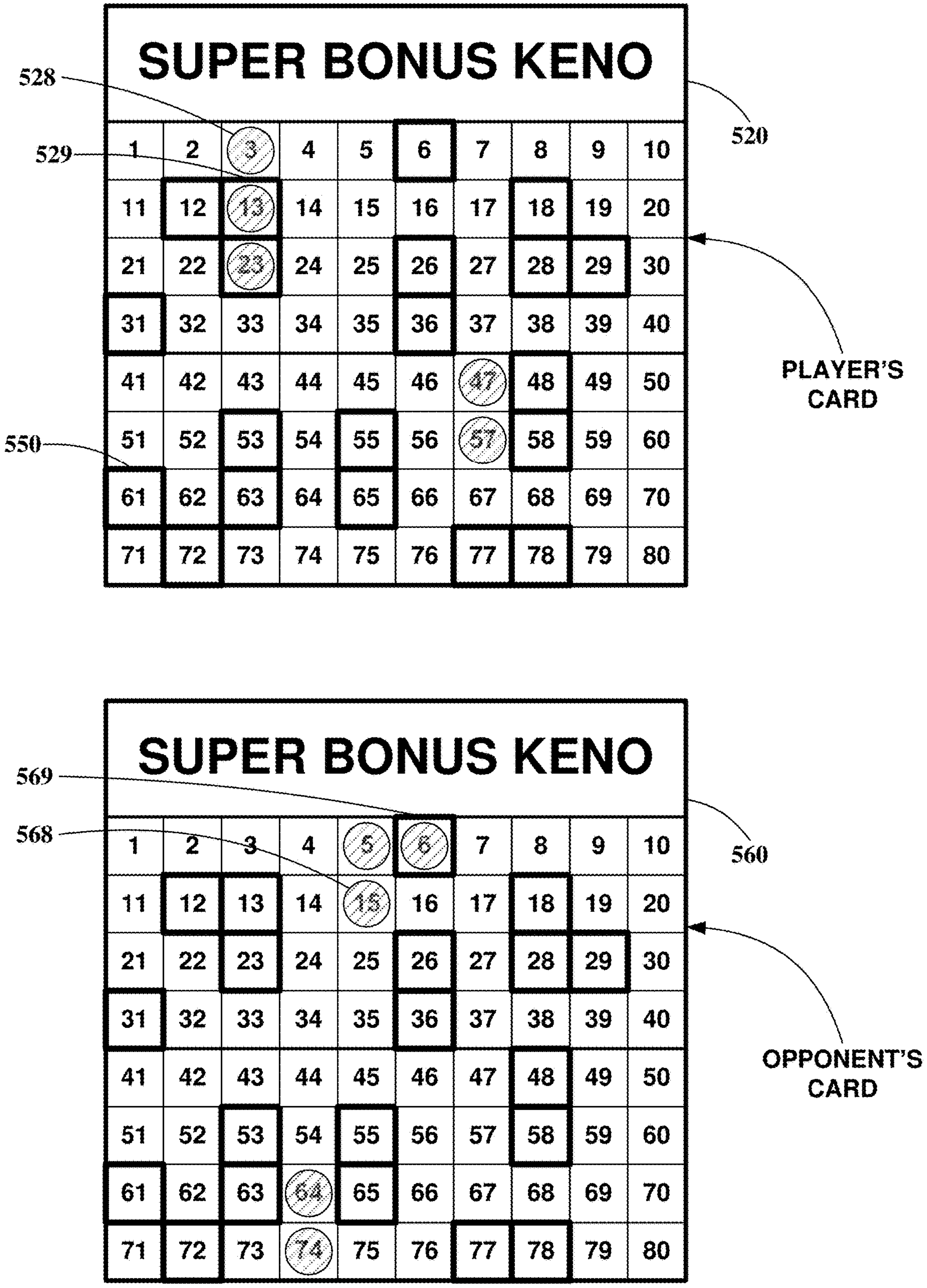

FIGS. 5A, 5B, and 5C are diagrams of a game progression involving a gridded card according to embodiments of the invention. In particular, FIGS. 5A-5C are associated with a keno-styled game event. Keno, like bingo, uses a gridded card and drawn items to match positions on the gridded card. Although one particular keno embodiment is shown in FIGS. 5A-5C, the other principles and embodiments discussed above and below are applicable to other keno game event embodiments. Similarly, all of the embodiments and principles discussed herein are applicable to other game events that utilize gridded playing areas.

In the embodiment shown in FIGS. 5A-5C, a keno game event is shown where five spots are selected on a player keno card and five spots are selected on an opponent keno card. After the draw of 20 keno balls, where corresponding locations on the keno cards are marked, the player and opponent keno cards are evaluated to determine if the player has matched more correct numbers than the opponent. If the player has matched more numbers, the keno game event proceeds to a next round of the game event. If the opponent has matched more numbers, the game event ends. If the player and opponent match the same number of items (i.e., the cards tie), a player may proceed to a next round with a reduced award, or a tie breaker process may be used. A tie breaker process may include, for example, continuing to draw numbers until a drawn number is matched with a marking on the player/opponent cards. In another example, the first card (or last card) to have a matching number may win the tie breaker. In yet another example, a random draw or event may be conducted to determine the winner in cases of a tie. Other tie breaker processes are also possible.

Referring to FIG. 5A, a keno card 520 is shown at the start of a keno game event. In FIG. 5B, five grid locations 528 are marked on the keno card 520. Here, the player may select the five grid locations 528 to mark, or the five grid locations may be randomly selected by the gaming device. In FIG. 5C the player card 520 and opponent card 560 are shown as marked 528, 568. The dark boxes 550 on each of the cards 520, 560 represent the 20 keno numbers (balls) that have been drawn. Note that the same numbers drawn are marked on each of the player card 520 and opponent card 560. However, in other embodiments, 20 (or another amount) of numbers may be drawn for the player card 520 and a separate 20 (or another amount) of numbers may be drawn for the opponent card 560. In these other embodiments, the dark boxes 550 for each of the cards 520, 560 would likely not match.

As shown in FIG. 5C, the player card 520 has matched 529 two out of the five numbers (13 and 23) while the opponent card has matched 569 one of the five numbers (6). Hence, in this round, the player card 520 beats the opponent card 560. The player may get an award for beating the opponent as well as awards for matching a certain number of drawn keno balls. In addition, by beating the opponent, the player may proceed to a next round of the keno game event.

FIGS. 6A, 6B, 6C, 6D, 6E, 6F, and 6G are diagrams of a gaming display showing a game progression of a gaming event according to embodiments of the invention. In particular, FIGS. 6A-6G illustrate a gridded card game that uses symbols in each grid positions, where various symbol items are drawn and matched to the symbols appearing in the grid. In this embodiment, each drawn symbol item is associated with an award value. Additionally, other items may be drawn. These other items may include multipliers, credit bonuses, "End Round" items, "Reset Grid" items, and other bonus items. An "End Round" item may automatically end a round or the entire game event. If the "End Round" item only ends the current round, it may automatically go to the next round in the game event (or be called a "Next Round" item), or may end the drawing of additional items where the player and opponent grids are evaluated to see if the game event proceeds to the next round. A "Reset Grid" item may clear all marked items on a grid, thereby allowing similar symbol items to be redrawn for additional credit awards.

Items are drawn until a round-end condition is satisfied. In this embodiment, a round ends when an entire row, column, or corner-to-corner diagonal is marked on one of the displayed cards. If a player card is the winning card (i.e., having an entire row, column, or corner-to-corner diagonal marked), the game event proceeds to a next game round. If, on the other hand, an opponent card is the winning card, the game event ends.

Figure 6A:
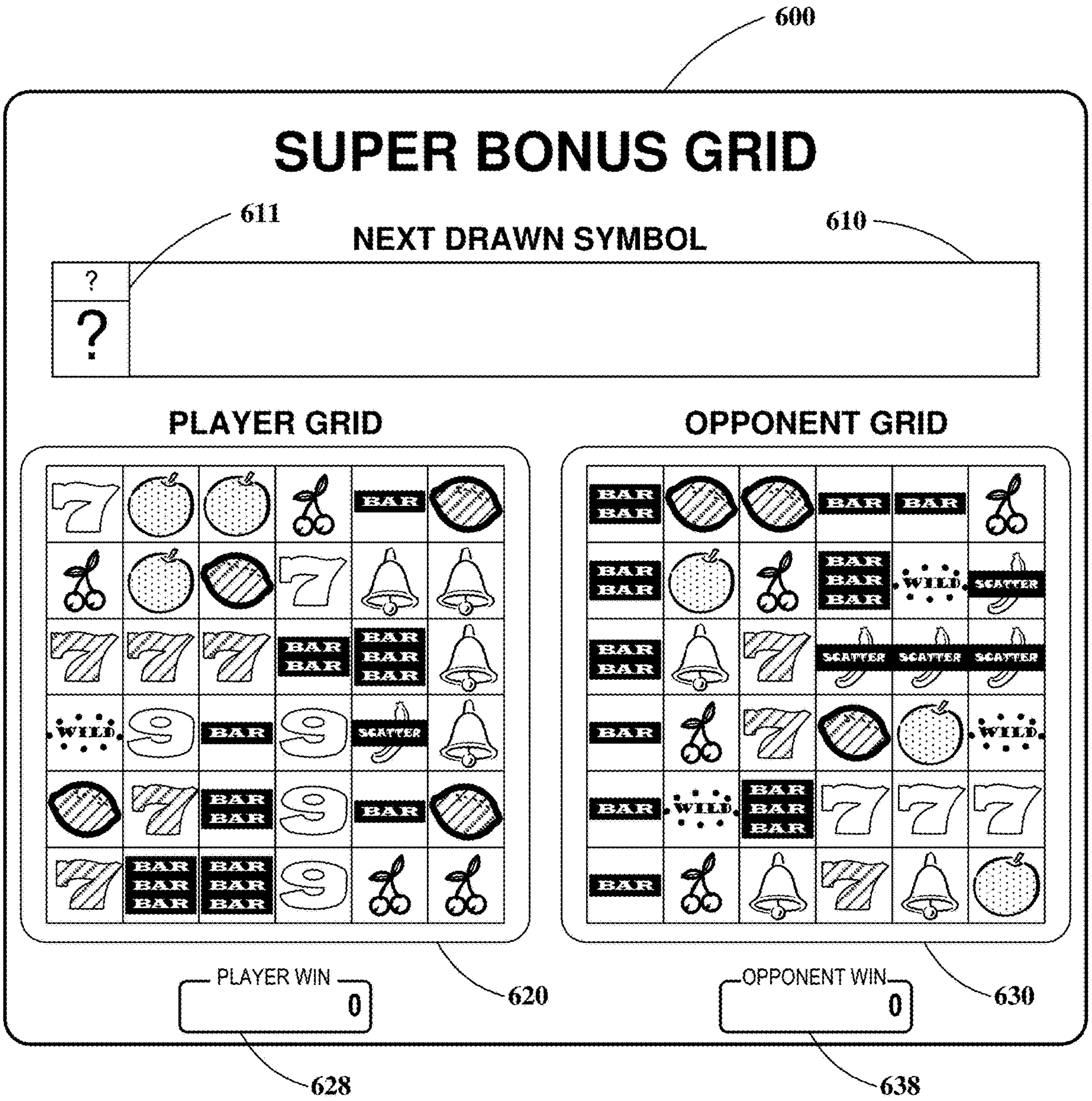
FIGS. 6A, 6B, 6C, 6D, 6E, 6F, and 6G are diagrams of a gaming display showing a game progression of a gaming event according to embodiments of the invention.

Referring to FIG. 6A, a game display 600 includes a gridded player card 620, a gridded opponent card 630, a "Player Win" meter 628, an "Opponent Win" meter 638, and a drawn symbol display 610 that shows drawn items 611. The player and opponent cards 620, 630 include a grid of randomly determined symbols. These symbols may be associated with game reels that spin prior to the drawing of symbol or other items. Alternatively, the symbols may be randomly selected for each grid location or otherwise randomly chosen for portions of the gridded cards 620, 630. In some embodiments, the symbols may be evaluated along paylines or other pay schemes (e.g., scatters, multi-way pays, etc.) for paying symbol combinations prior to symbols being drawn in the drawn symbol display 610.

Figure 6B:
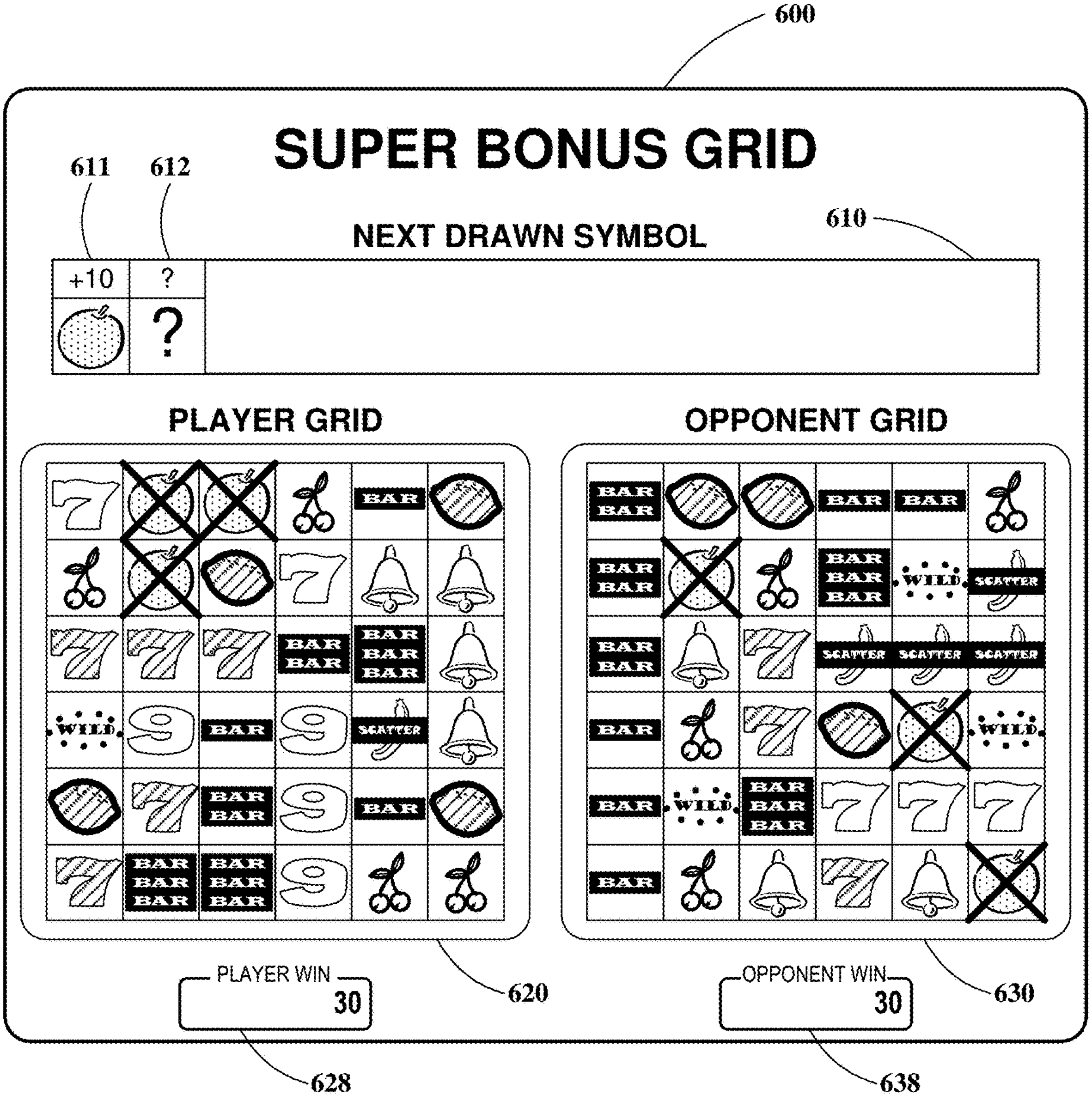

In FIG. 6B, an orange symbol 611 is drawn first and displayed in the drawn symbol display 610. The orange symbol 611 includes a credit value. This credit value may be predetermined according to a paytable, or may be randomly chosen along with the symbol that is randomly selected. As shown on the player and opponent cards 620, 630 each orange symbol appearing in the respective grids is marked. Additionally, for each matching symbol marked, an award corresponding to the symbol item 611 value (here, 10 credits) is added to the respective Win meters 628, 638. Thus, since both the player card 620 and opponent card 630 have three orange symbols, each Win meter 628, 638 reflects a 30 credit award.

Figure 6C:
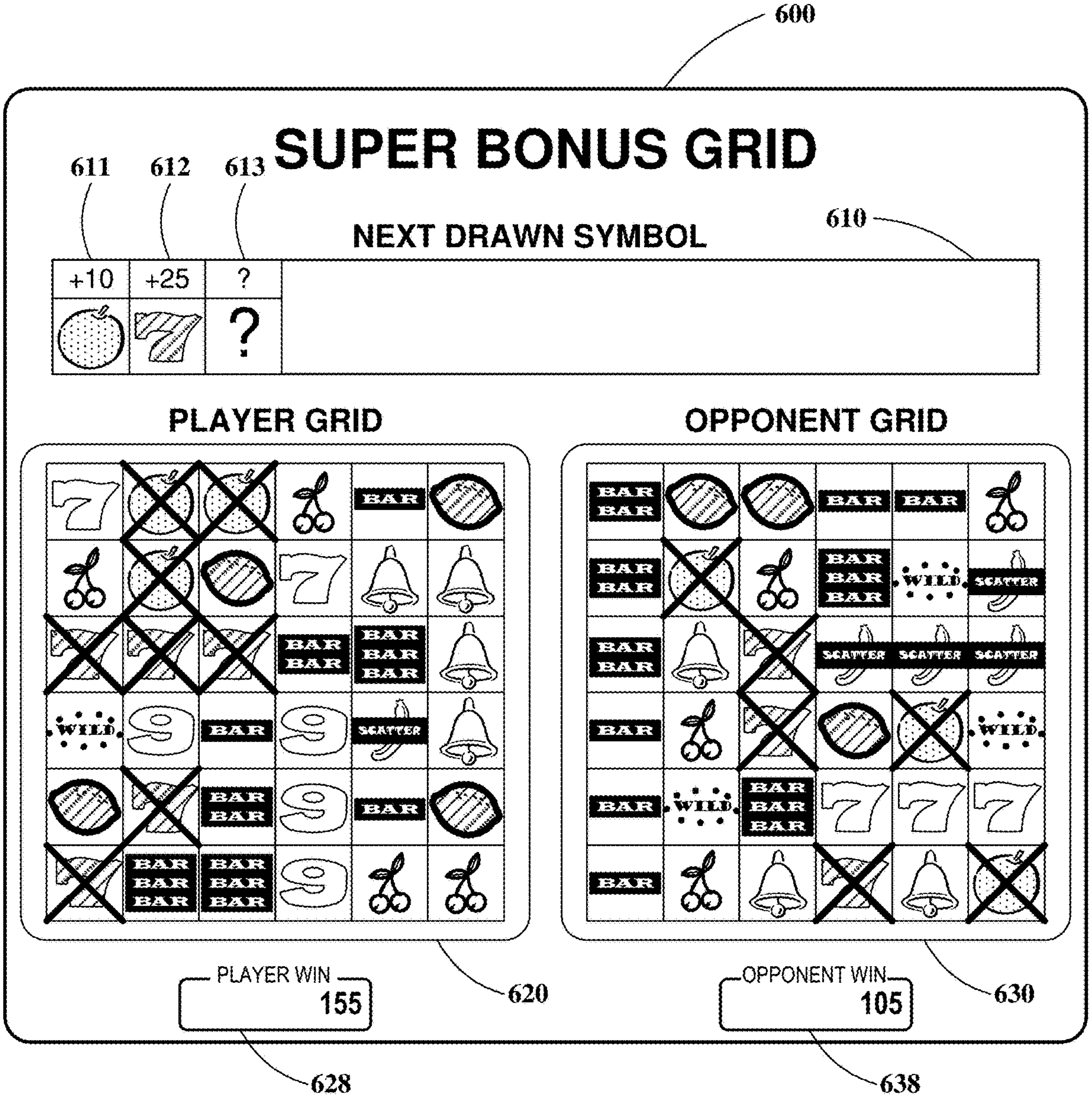
Figure 6D:
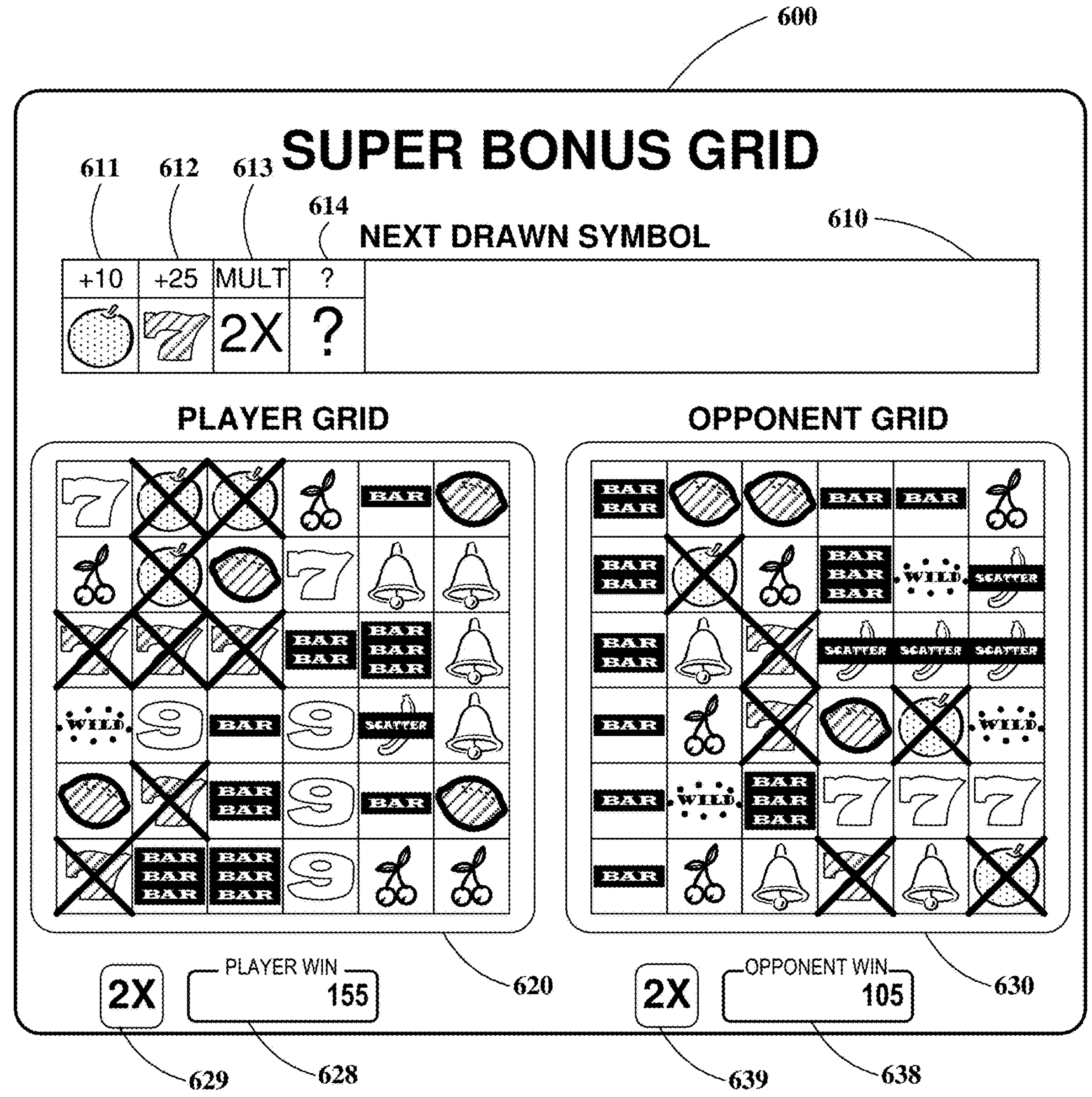

In FIG. 6C, a shaded seven symbol 612 is drawn next. The corresponding shaded seven symbols in the cards 620, 630 are marked, and the Win meters 628, 638 are updated to reflect winnings based on the value associated with the drawn symbol item 612 and the number of matching symbols occurring in each card. In FIG. 6D, a multiplier item 613 is drawn next. This multiplier item is not associated with any symbol in the grids, but provides a multiplier value (here, "2×") item 629, 639 for each Win meter 628, 638.

Figure 6E:
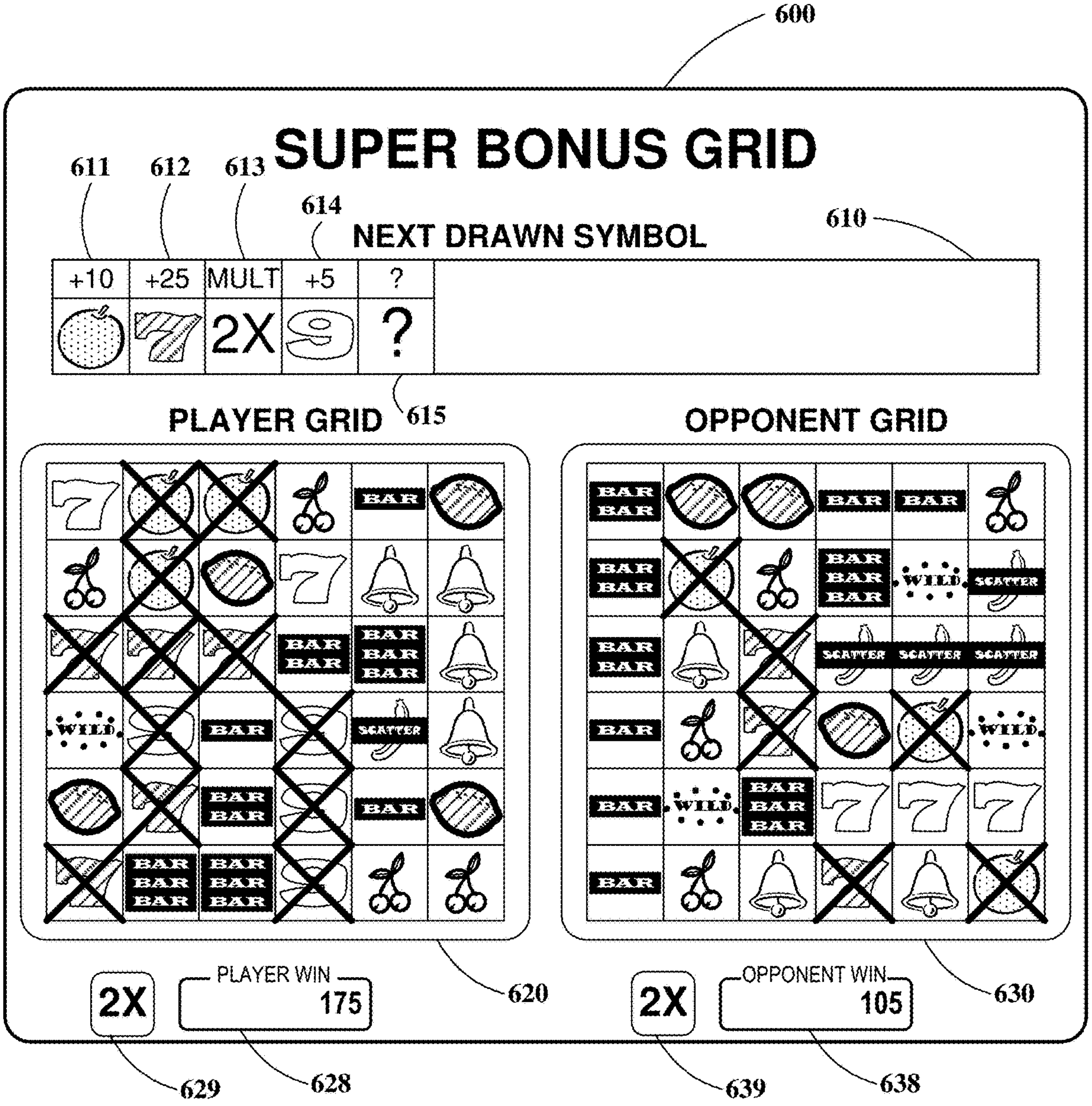
Figure 6F:
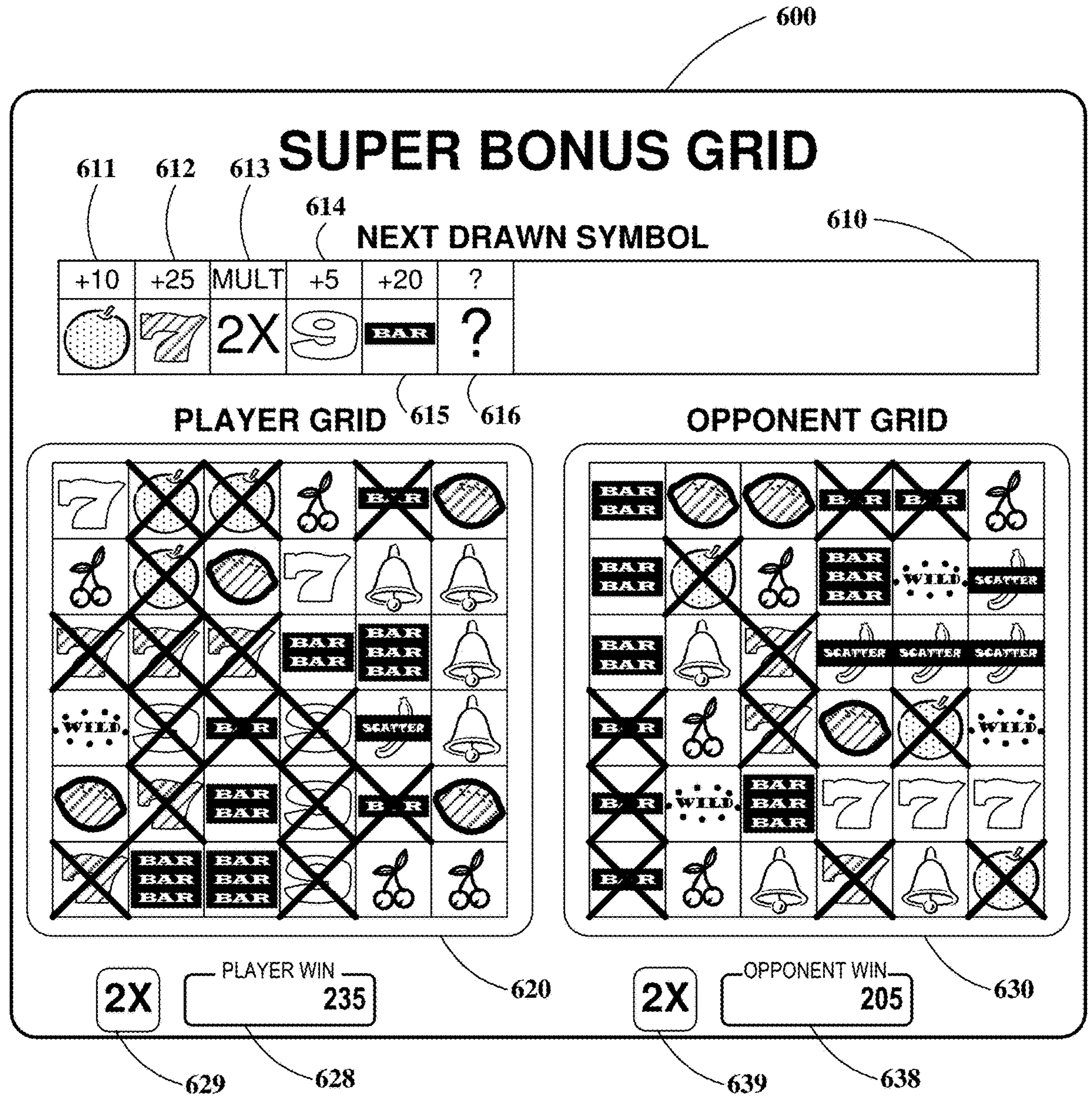

In FIG. 6E, a "9" symbol 614 is drawn next. Again, the corresponding "9s" in the cards 620, 630 are marked and the Win meters 628, 638 are updated to reflect winnings based on the value associated with the drawn symbol item 614 and the number of matching symbols occurring in each card. In FIG. 6F, a bar symbol 615 is drawn next. Again, the corresponding bar symbols in the cards 620, 630 are marked and the Win meters 628, 638 are updated to reflect winnings based on the value associated with the drawn symbol item 615 and the number of matching symbols occurring in each card.

Figure 6G:
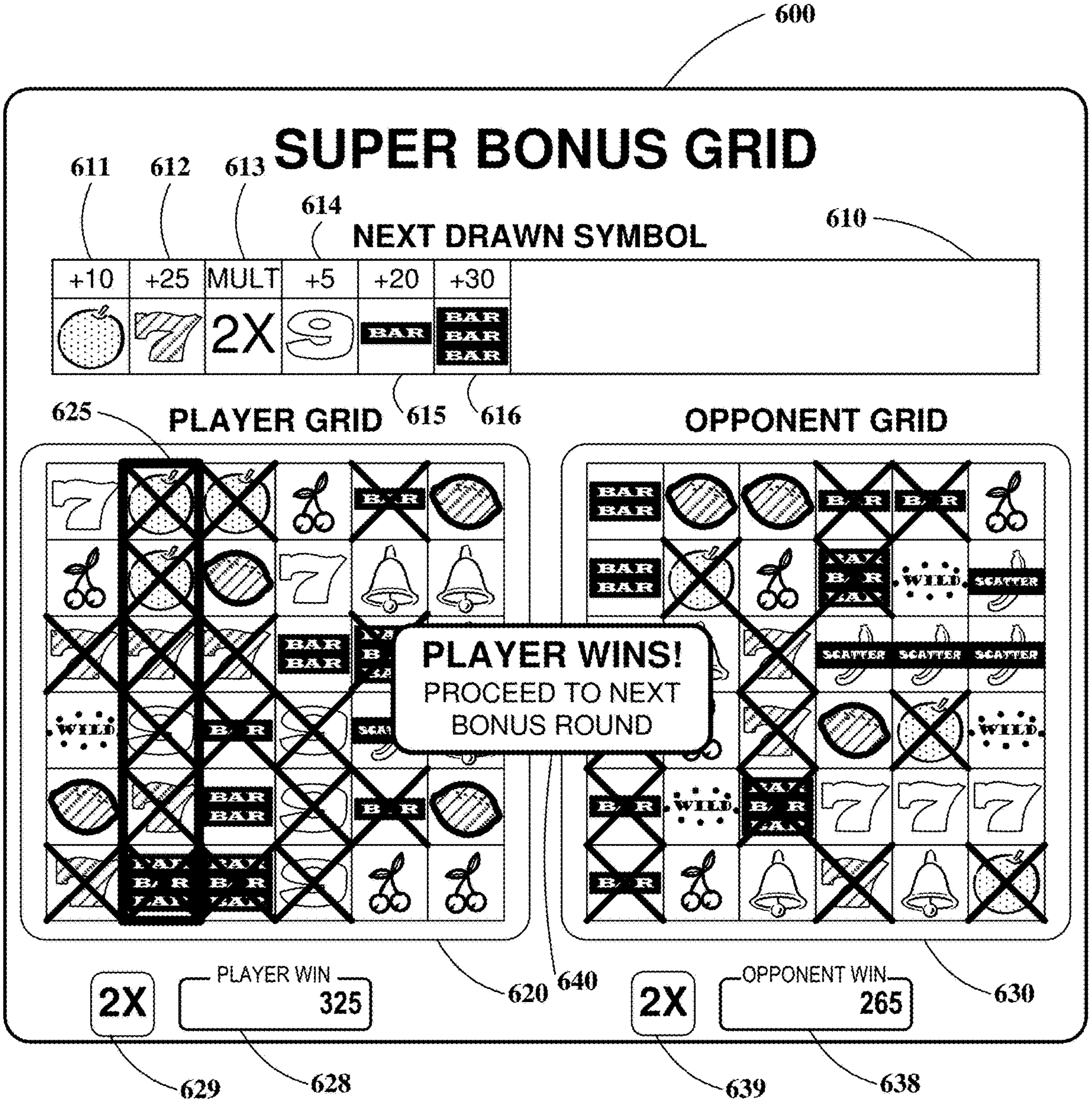

In FIG. 6G, a triple bar symbol 616 is drawn next. Again, the corresponding triple bar symbols in the cards 620, 630 are marked and the Win meters 628, 638 are updated to reflect winnings based on the value associated with the drawn symbol item 616 and the number of matching symbols occurring in each card. This time, however, the drawing of the triple bar symbol completes a marked column 625 on the player card 620. As the player is the first to generate an end condition (in this case, a marked column) the player proceeds to a next bonus round. The multiplier items 629, 639 may be applied to the Win meter values now (where they would be updated to 650 credits for the Player Win meter and 530 credits for the Opponent Win meter) or may be saved until the end of the game event where the final award value is multiplied by the value of the multiplier item.

Embodiments similar to the embodiment shown in FIGS. 6A-6G may work well in a community bonus embodiment. For example, in a gaming device having four game stations (or a bank of four connected gaming machines) a large display screen could be used to show four player cards. Items may be drawn until one or more of the players is eliminated or reaches an end condition. In some embodiments, an ending condition may be caused when a column, row, diagonal, or other predefined pattern is completely marked. In these embodiments, each player continues to win credits and multipliers until they receive a completely marked column, row, diagonal, or other predefined pattern. Once they reach this end condition, they no longer receive any of the future credits or multiplier awards drawn. This may continue until all players in the community bonus receive an end condition. In some embodiments, the player to reach the end condition first is eliminated from the bonus or game event and the remaining players proceed to another bonus or game round.

In other embodiments, an end condition may be caused when all but one remaining players reaches a marked column/row/diagonal, or any other ending condition. In these embodiments, the remaining three players may proceed to the next round. Then the final two players may play head to head in a third round. The final winner may receive an additional prize for winning the bonus event.

Figure 7:
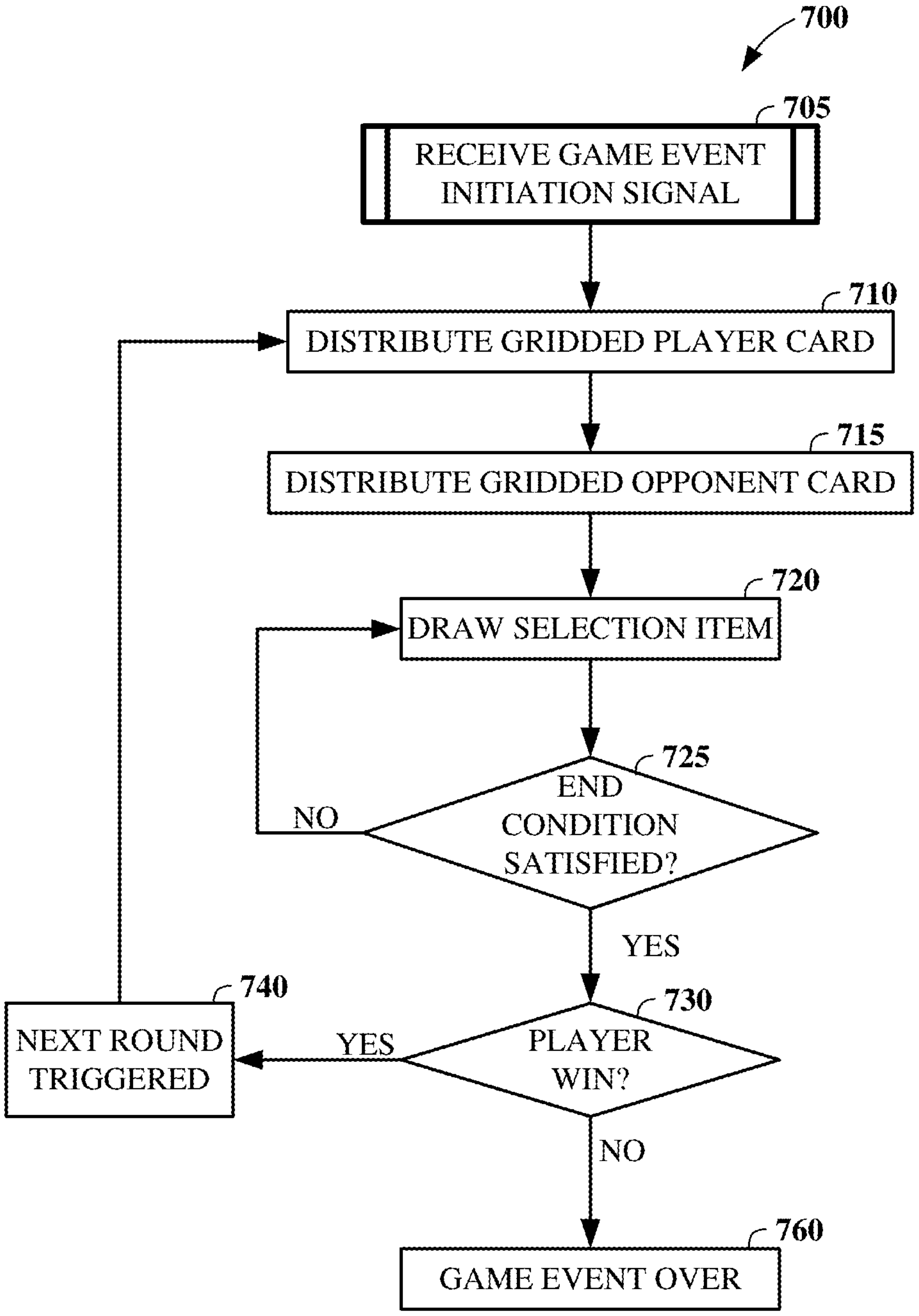
FIG. 7 is a flow diagram illustrating an example method of utilizing a card game in a gaming device according to embodiments of the invention.
Figure 8:
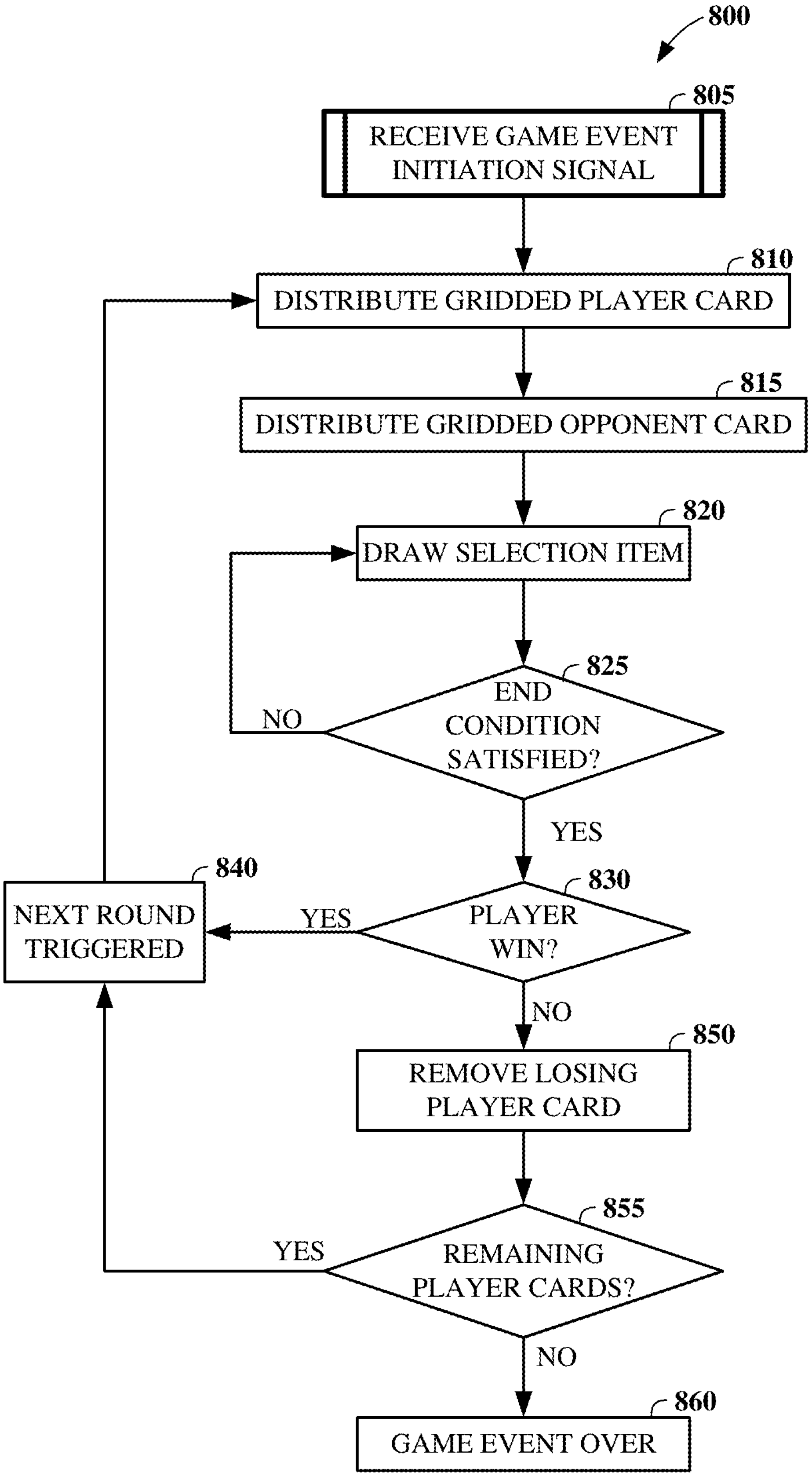
FIG. 8 is a flow diagram illustrating an example method of utilizing a card game in a gaming device according to embodiments of the invention.
Figure 9:
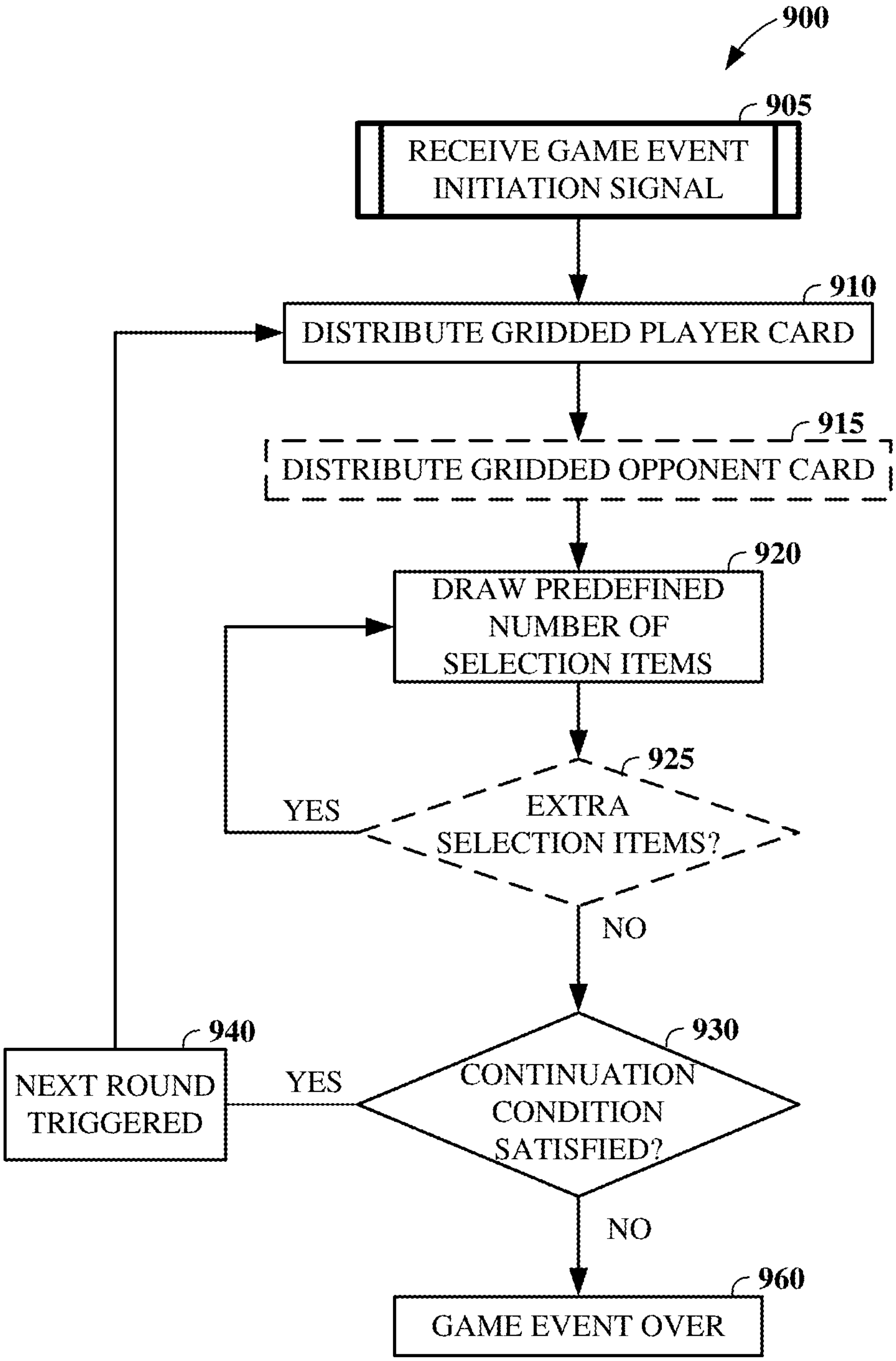
FIG. 9 is a flow diagram illustrating an example method of utilizing a card game in a gaming device according to embodiments of the invention.

FIGS. 7, 8, and 9 are flow diagrams illustrating example methods of utilizing a card game in a gaming device according to embodiments of the invention. Although various processes are shown in a particular order in these flow diagrams, the order of these processes can be changed in other embodiments without deviating from the scope or spirit of this concept. Hence, the order of the processes shown is for illustrative purposes only and is not meant to be restrictive. Additional game processes may also be included between various processes even though they are omitted from these flow diagrams for clarity purposes. Further, each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device.

Note that these example methods are just some embodiments of how a card game can be implemented. As discussed and shown above, many variations exist which may require additional, fewer, or different processes to complete.

Referring to FIG. 7, flow 700 begins at process 705 where a game event initiation signal is received. In embodiments where the subsequently described card game is a bonus game, the game event initiation signal may be a signal that is triggered when a bonus condition is satisfied. In embodiments where the card game is a base or primary game, the game event initiation signal may be a signal that is triggered when a wager is received and a game initiation button is activated. In process 710 one or more gridded player cards are distributed. In this process, the one or more gridded cards are generated and the grid positions on the one or more gridded cards are populated with indicia or symbols. Process 710 may include randomly generating symbols or indicia within grid positions, or may include a selection process (such as shown in FIGS. 4A-4C) to populate the grid positions. In embodiments where grid indicia is fixed (such as shown in FIGS. 5A-5C), process 710 may include marking symbols or other indicia on the grids to represent selected grid positions.

In process 715, one or more opponent cards are distributed. These opponent cards may be distributed in similar manners to the distribution of player cards as described above. Additionally, in embodiments where the one or more opponent's cards include a representation of another linked player, process 715 may include receiving remote selection data and implementing the received data into opponent cards to display on the gaming device. In embodiments where the one or more opponent's cards includes a computer or virtual opponent, process 715 may include randomly selecting indicia to populate the grid with, or randomly selecting grid positions to mark with marker indicia.

In process 720, a selection item is drawn. As described above, a selection item may be any item relating to identification of a grid position (such as a called bingo or keno ball), or any item that interacts with game play on the gridded cards (such as a multiplier, credit bonus, action icon, etc.). In process 725, it is determined if an end condition is satisfied. As described above, end conditions may relate to a certain occurrence in the draw (such as drawing a "End" ball or drawing the last of a predetermined number of selection items) or may relate to a condition being present on one or more of the grids (such as a five-in-a-row BINGO). If an end condition is not satisfied, flow 700 returns to process 720 where another selection item is drawn. If an end condition is satisfied, flow 700 proceeds to process 730 where it is determined if the player "won."

In the context of this embodiment, a player "wins" when he or she continues on to another round of the bonus. This might reflect various patterns on the gridded player card being present, reflect a particular selection item being drawn (such as a "Next Round" ball), or reflect another condition related to play of the gaming event being present. If no player "win" is determined in process 730, flow 700 proceeds to process 760 to end the game event. Process 760 may include providing awards accumulated during one or more game rounds that have been played. If a player "win" is determined in process 730, flow 700 proceeds to process 740 where a next game round is triggered. Flow 700 then returns to process 710 to the distribution of a gridded player card. In some embodiments, a player can maintain a previously played gridded game card. In other embodiments, new gridded game cards are generated and distributed for each game round of the gaming event.

FIG. 8 illustrates an embodiment that has some similar processes to the embodiment shown in FIG. 7. However, the embodiment in FIG. 8 does not end a bonus when a player "win" is not present. For example, the embodiment shown in FIG. 7 may be used with a bingo bonus game where at least one player bingo card receives a five-in-a-row bingo prior to an opponent bingo card receiving a five-in-a-row bingo. In the embodiment illustrated in FIG. 8, similar processes to those corresponding ones described above in relation to the embodiment shown in FIG. 7 (such as processes 805, 810, 815, 820, 825, 830, 840, and 860) may be used. However, flow 800 in FIG. 8 also utilizes processes 850 and 855 to determine if a bonus should continue even when a player "win" is not received in process 830. In particular, if it is determined in process 830 that a player "win" is not present when an end condition is satisfied, flow 800 proceeds to process 850 where one or more player cards are removed. If, for example, the player began with three player cards, but one of the player's cards did not receive a five-in-a-row bingo before an opponent's card received a five-in-a-row bingo, that player's "losing" player card may be removed from play.

In process 855, it is determined if the player has any remaining gridded game cards. Here, if the player loses one of three cards in process 850, as with the example above, but still retains two other gridded game cards, flow 800 proceeds to process 840 where a next game round is triggered. If it is determined in process 855 that the player does not have any remaining cards, flow 800 proceeds to process 860 where the game event is over.

Referring to FIG. 9, flow 900 begins at process 905 where a game event initiation signal is received. As described above with respect to process 705 in relation to the embodiment shown in FIG. 7, in embodiments where the subsequently described card game is a bonus game, the game event initiation signal may be a signal that is triggered when a bonus condition is satisfied. In embodiments where the card game is a base or primary game, the game event initiation signal may be a signal that is triggered when a wager is received and a game initiation button is activated. In process 910 one or more gridded player cards are distributed. In this process, the one or more gridded cards are generated and the grid position on the one or more gridded cards are populated with indicia or symbols. Process 910 may include randomly generating symbols or indicia within grid positions, or may include a selection process (such as shown in FIGS. 4A-4C) to populate the grid positions. In embodiments where grid indicia is fixed (such as shown in FIGS. 5A-5C), process 910 may include marking symbols or other indicia on the grids to represent selected grid positions.

Process 915 is an optional process and relates to how a continuation condition is satisfied in process 930. In embodiments where the continuation condition is contingent at least in part on a comparison between player card(s) and opponent card(s), optional process 915 is used to distribute the opponent's gridded cards. In these embodiments, the opponent card(s) may be distributed in similar manners to the distribution of player cards as described above. Again, the "opponent" may be another linked player or a computer player controlled by a local or remote processor. In embodiments where the continuation condition is only dependent on results related to the player card(s), optional process 915 may be omitted and no "opponent" is included in the game event.

In process 920, a predefined number of selection items are drawn. As described above, a selection item may be any item relating to identification of a grid position (such as a called bingo or keno ball), or any item that interacts with game play on the gridded cards (such as a multiplier, credit bonus, action icon, etc.). In optional process 925, it is determined whether additional selection items are to be drawn. In some embodiments, a player may place a side bet or additional wager to draw more selection items. This may allow a player to complete a higher paying pattern on the card grid, or improve chances on receiving a bonus item such as a multiplier value. If additional selection items are to be drawn, flow 900 returns to process 920 where another predetermined number of selection items are drawn. Note that the second predefined number may not be the same as the first predefined number of selection items originally drawn. For example, 20 original selection items may be drawn and then the player may have an option of placing additional wagers for 5 extra selection items (or any number of extra selection items, which may or may not vary in number).

After selection items are drawn, flow 900 proceeds to process 930 where it is determined if a continuation condition is satisfied. In process 930 the continuation condition may relate to competition between results on a player card and results on an opponent card, or may relate only to results received in relation to a player card (pattern received, "Next Round" selection item received, etc.). If a continuation condition is not satisfied in process 930, flow 900 proceeds to process 960 to end the game event. Process 960 may include providing awards accumulated during one or more game rounds that have been played. If a continuation condition is satisfied in process 930, flow 900 proceeds to process 940 where a next game round is triggered. Flow 900 then returns to process 910 for distribution of one or more additional gridded player cards. In some embodiments, a player can maintain a previously played gridded game card. In other embodiments, new gridded game cards are generated and distributed for each game round of the gaming event.

Figure 10A:
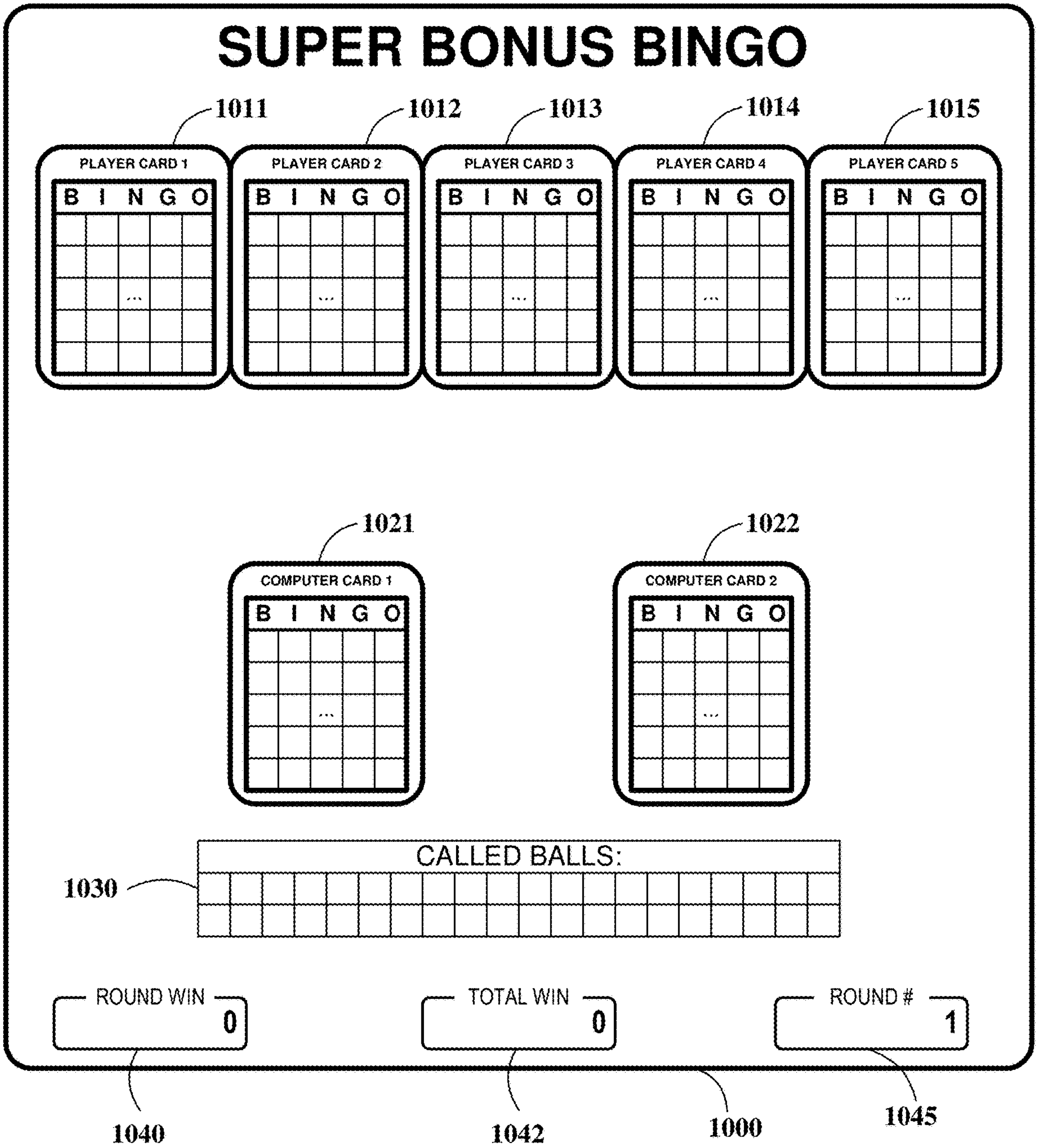
FIGS. 10A, 10B, 10C, 10D, and 10E are diagrams of a gaming display showing a game progression of a gaming event according to embodiments of the invention.

FIGS. 10A, 10B, 10C, 10D, and 10E are diagrams of a gaming display showing a game progression of a gaming event according to embodiments of the invention. Referring to FIG. 10A, a gaming display includes multiple gridded player cards 1011, 1012, 1013, 1014, 1015 and multiple gridded opponent cards 1021, 1022. In this embodiment a "bingo" style bonus game is shown where a player receives five gridded cards 1011, 1012, 1013, 1014, 1015, and a computer opponent is given two gridded cards 1021, 1022. A ball call area 1030 is provided to display a plurality of drawn bingo balls, and the display 1000 also includes a "Round Win" meter 1040, a "Total Win" meter 1042, and a "Round Number" meter 1045. In this embodiment, bingo balls are drawn and called until either all player cards 1011-1015 have at least one five-in-a-row bingo, or all opponent cards 1021, 1022 have at least one five-in-a-row bingo. If some of the player cards 1011-1015 do not have a five-in-a-row bingo when both opponent cards 1021, 1022 have a five-in-a-row-bingo, the number of "losing" player cards without a five-in-a-row bingo are removed from play up to two cards (one for each of the "winning" opponent cards). Additional bonus rounds continue until the player does not have any cards 1011-1015 left to play.

Figure 10B:
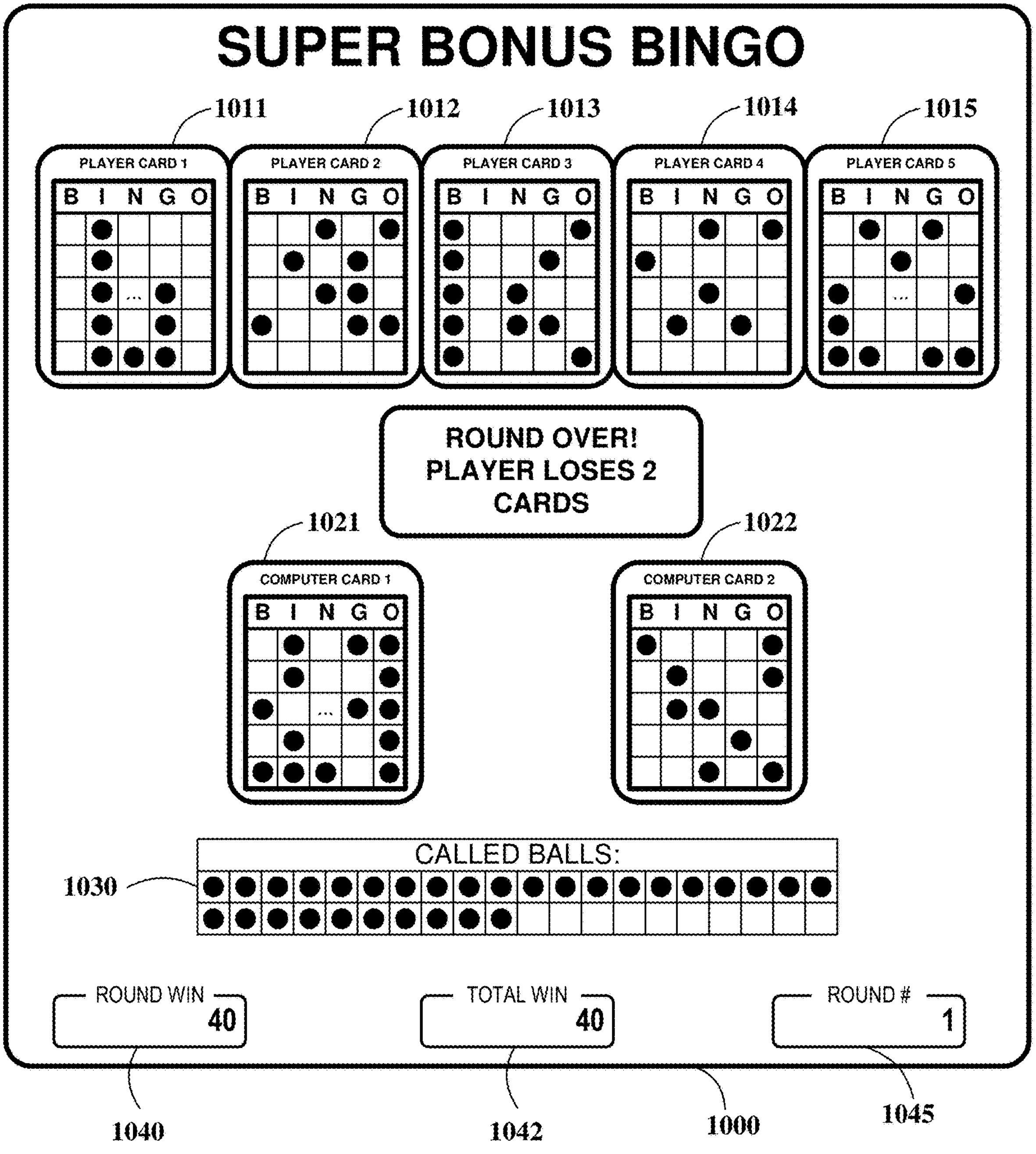
Figure 10C:
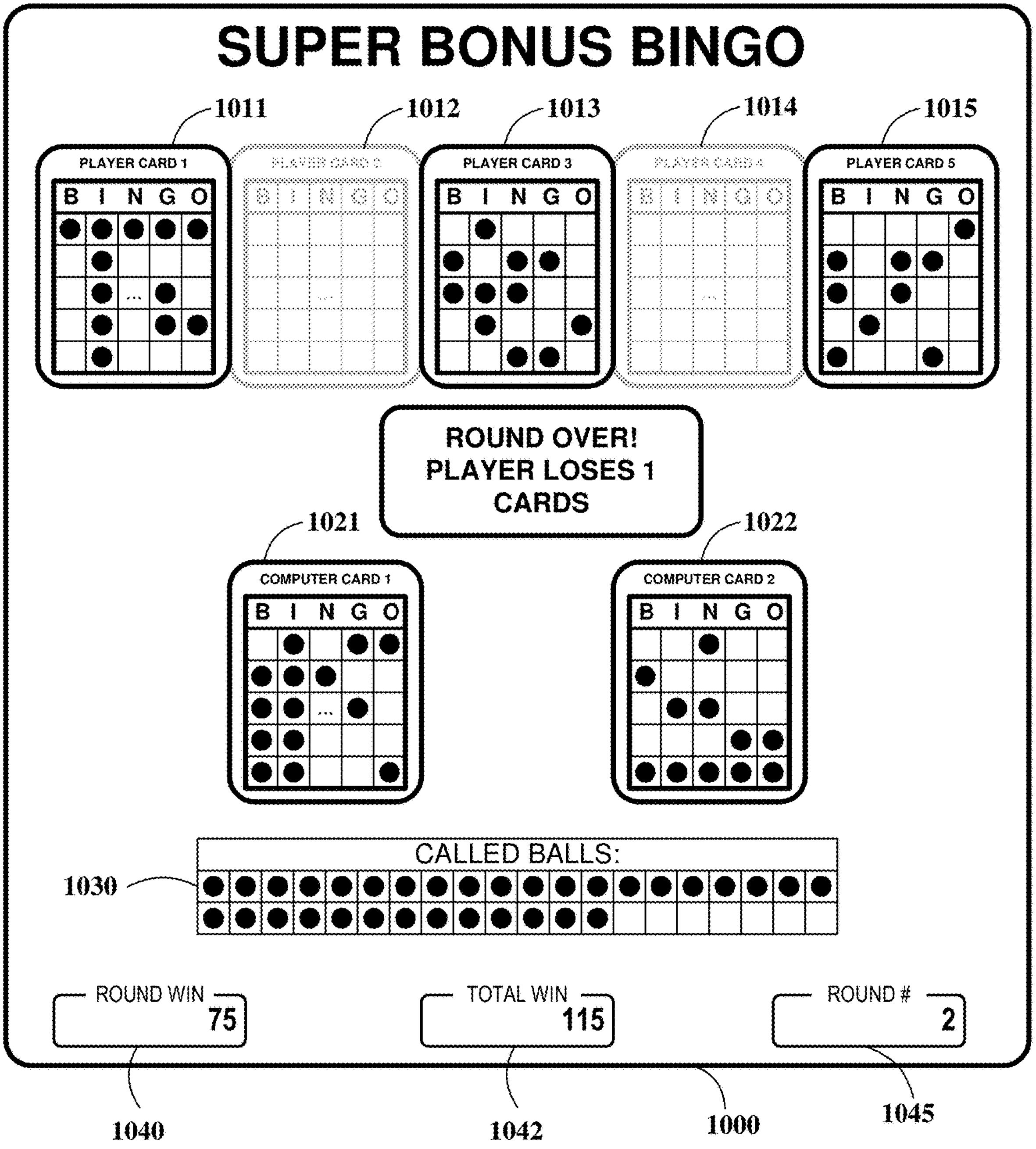

Referring to FIG. 10B, bingo balls are randomly drawn and called. The drawn bingo balls are placed in the ball call area 1030, and matching numbers on the player cards 1011-1015 and opponent cards 1021, 1022 are marked. FIG. 10B illustrates the end of Bonus Round 1, which ends after both opponent cards 1021, 1022 have five-in-a-row bingos. Note that it took 30 balls to be drawn for this result. In round 1, all bingos are worth 20 credits to a player. Hence, because the player received a five-in-a-row bingo on "Player Card 1" 1011 and "Player Card 3" 1013, the player is awarded 40 credits as shown on the Round Win meter 1040 and Total Win meter 1042. However, since the player did not receive five-in-a-row bingos on Player Cards 2, 4, and 5 1012, 1014, and 1015 the two lowest total cards 1012 and 1014 are removed (or made inactive) as shown in FIG. 10C.

Figure 10D:
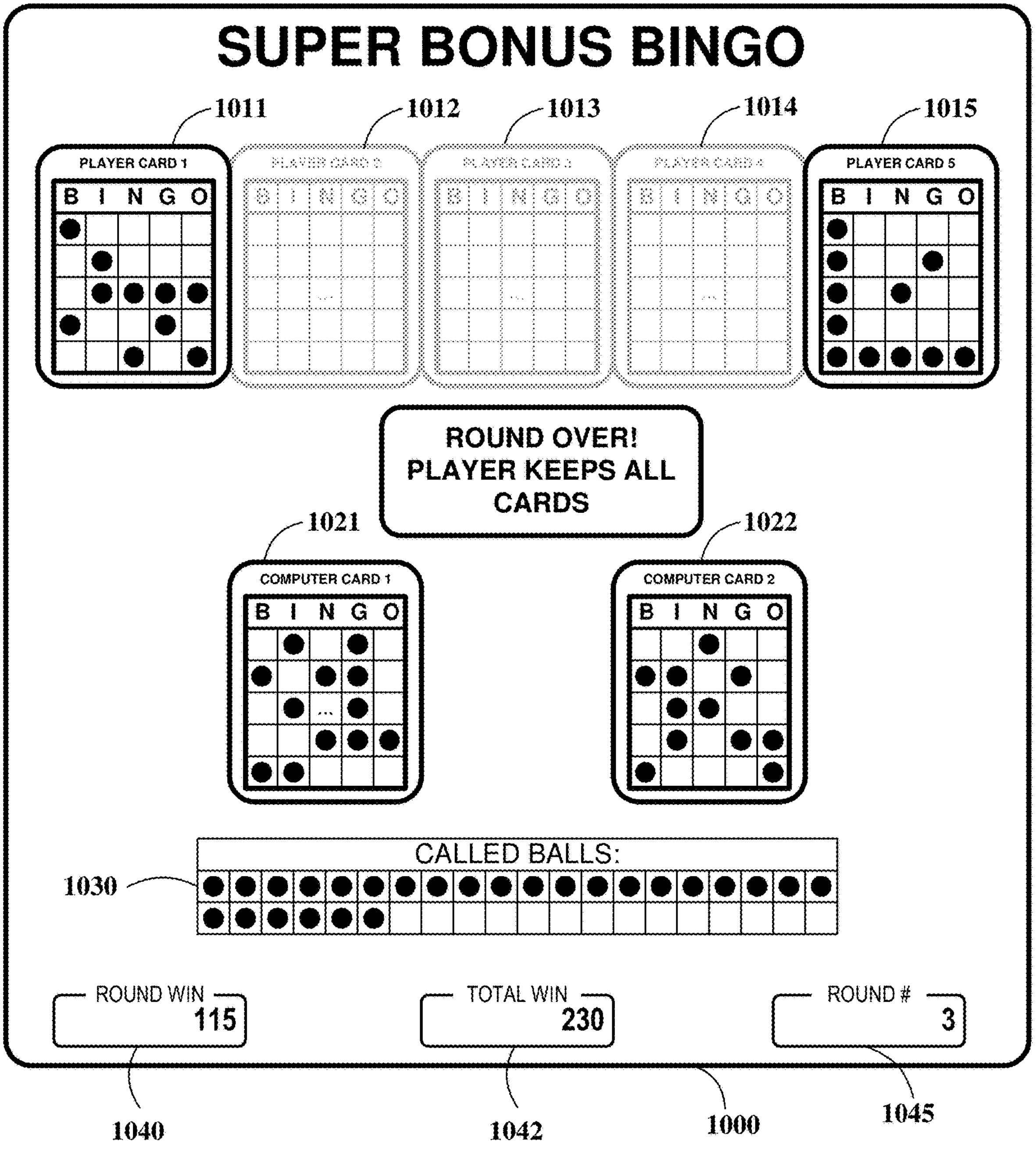

In the second round of bonus play, as shown in FIG. 10C, bingo balls are again called until each of the active player cards 1011, 1013, 1015 results in a five-in-a-row bingo, or each of the opponent cards 1021, 1022 result in a bingo. In this instance, both opponent cards 1021, 1022 reach the five-in-a-row bingo first, thereby ending this second round of bonus play. In this second round, each player five-in-a-row bingo is worth 25 credits. Here, the player received two five-in-a-row bingos on Player Card 1 1011 and one five-in-a-row bingo on Player Card 5, 1015. Thus, the player is awarded 75 credits. However, since Player Card 3 1013 did not receive a five-in-a-row bingo it is considered a losing card and is removed or inactivated as shown in FIG. 10D. Since the player still has two active cards 1011, 1015, the bonus event continues to the next round: Round 3.

As shown in FIG. 10D, Round 3 of the bonus event is played and ends when both active player cards 1011, 1015 receive five-in-a-row bingos. In particular, Player Card 1 1011 has a single five-in-a-row bingo, and Player Card 5 1015 has two five-in-a-row bingos. Additionally, the five-in-a-row bingos on Player Card 5 1015 result in an "L" bingo pattern that is associated with a bonus award. Here, each five-in-a-row bingo for a player is worth 30 credits and an "L" bingo bonus is worth 25 extra credits. Thus, the player receives a total of 115 credits for Round 3, and keeps both cards 1011, 1015 for the next round.

In some embodiments, as discussed above, a round may be extended in certain circumstances to allow a player to continue to draw items and improve awards for a given round. Here, for example, although the round has ended by the rules set out above since the player has received five-in-a-row bingos on all remaining cards, neither opponent card has a five-in-a-row bingo. Thus, in different embodiments, items may continue to be drawn until both opponent cards receive a bingo. These embodiments may allow a player to receive additional five-in-a-row bingos or other special bingo patterns associated with additional awards.

Figure 10E:
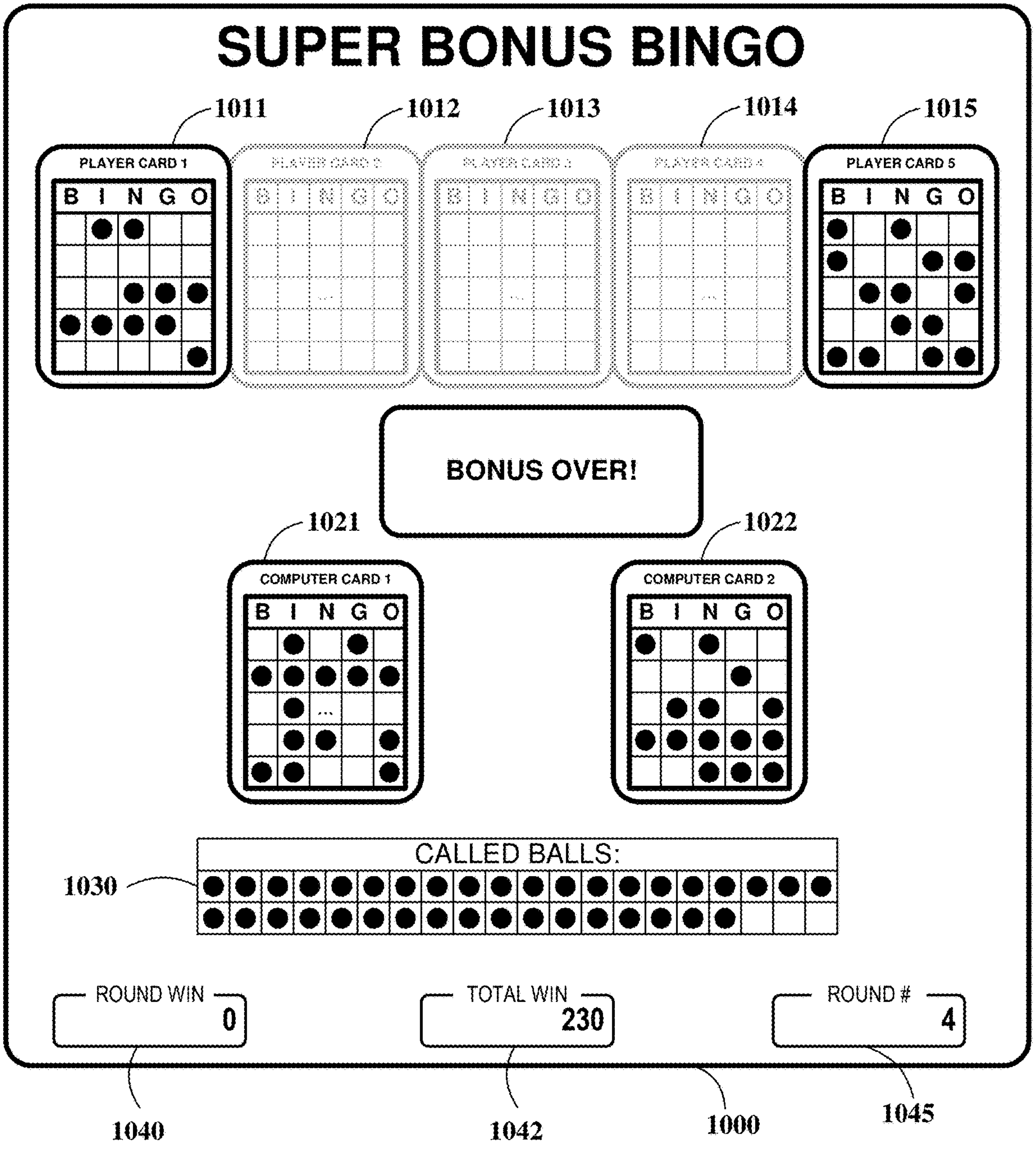

FIG. 10E shows the results of Round 4, which were not good for the player. Here, neither remaining player card 1011, 1015 recorded a five-in-a-row bingo prior to both opponent cards 1021, 1022 recording five-in-a-row bingos. Thus, the bonus ends. Additionally, although five-in-a-row bingos are now worth 35 credits (their value increments by 5 credits for each round of play), the lack of bingo results in no prizes awarded for this round.

In other embodiments, the player may get a consolation prize, or prizes in general may be based on more than just five-in-a-row bingos and special bingo patterns. Additionally, although five-in-a-row bingos are used as player "win" criteria for these embodiments, other embodiments may use different criteria. For example, a total number of marked spots on each card may dictate winning or losing cards. In other embodiments, a losing player card may be immediately removed for each opponent card that receives a bingo regardless if the other opponent card has a bingo yet. In some embodiments, opponent cards may be removed when all of the player cards are winning cards, or removed/deactivated player cards may be reactivated or brought back when certain conditions exist. Similarly, rounds may end for different reasons than stated above. For example, instead of rounds ending when all player cards or all opponent cards receive a five-in-a-row bingo, rounds could end after a predetermined number of balls are drawn, a "Round End" ball is drawn, or another condition is met.

FIGS. 11A, 11B, 11C, 11D, 11E, 11F, 11G, 11H, 11I, and 11J are diagrams of a gaming display showing a game progression of a gaming event according to embodiments of the invention. As shown in this example embodiment, a gaming event may be implemented where a player is only playing against the balls drawn from the hopper. That is, in some embodiments, there may not be an "opponent" card that is being played against. Rather, a player is given one or more gridded cards and various indicia or numbers are selected and matched with indicia or numbers on the one or more player cards. In some embodiments, the gaming event is a multi-round event where the result of the matching process is evaluated to determine if game play will progress to a next round of the gaming event. Many of the other variations described in other embodiments may also be applied to various embodiments using only player cards.

Referring to FIGS. 11A-11J, a bingo-type gaming event is shown on a game display 1100 having four player cards 1120, 1130, 1140, 1150 each with a 3×5 grid 1125, 1135, 1145, 1155, respectively. Additionally, each of the player cards 1120, 1130, 1140, 1150 is associated with a card win meter 1129, 1139, 1149, 1159 that shows awards associated with specific ones of the player cards. A "Total Win" meter 1170 and "Round" meter 1172 are also included to show the number of rounds completed in the gaming event and the total award won during the gaming event. The gaming display 1100 also depicts a ball hopper 1110 and a "Called Ball" area 1115 that includes an initial draw portion 1116 and a secondary draw portion 1118. In this bingo-type game shown in this embodiment, a predefined number of balls (here twenty four, but could be any number) are initially drawn and placed in the initial draw portion 1116. A secondary draw then takes place that randomly draws between one and six extra balls, which are then displayed in the secondary draw portion 1118.

Figure 11A:
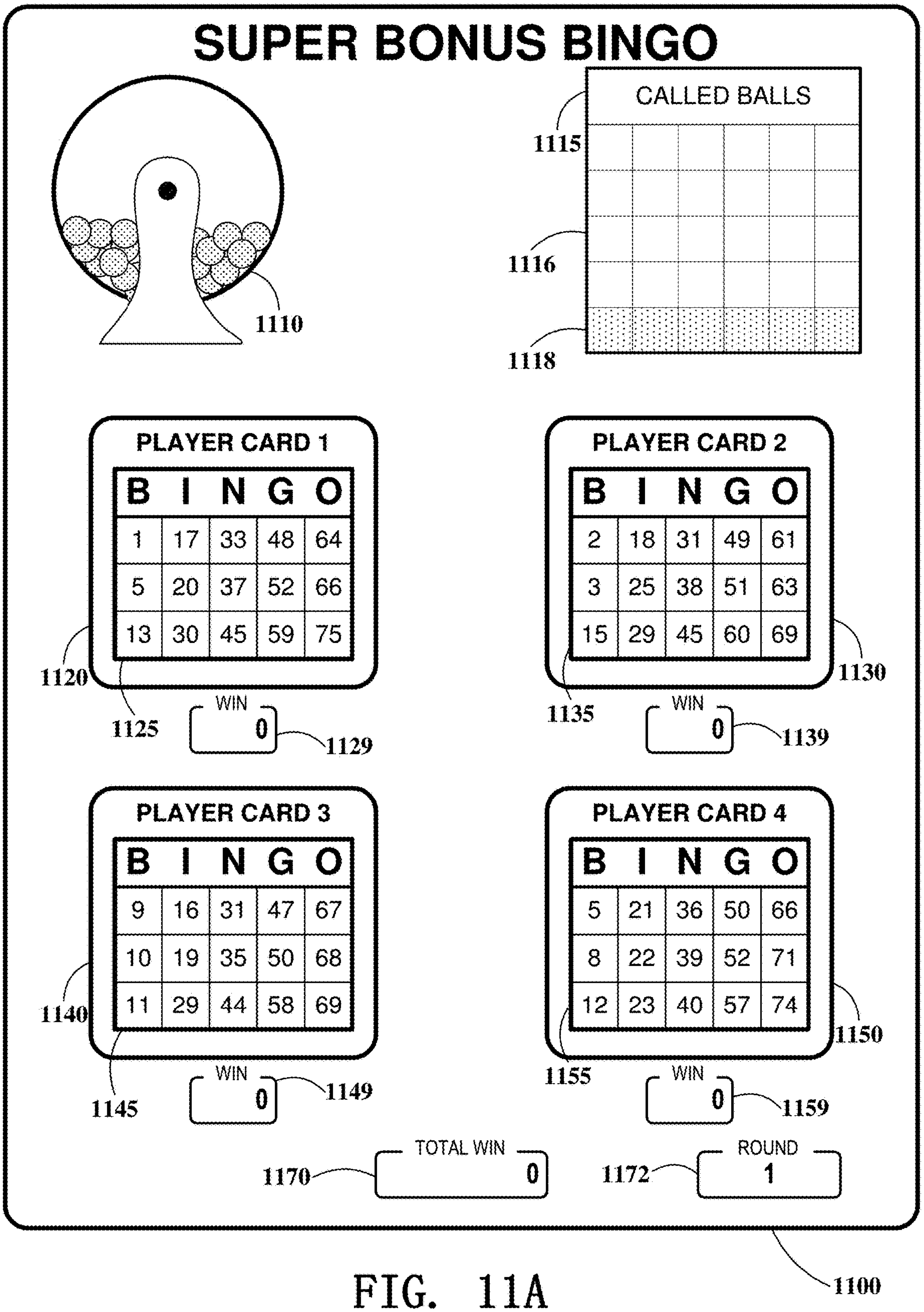
FIGS. 11A, 11B, 11C, 11D, 11E, 11F, 11G, 11H, 11I, and 11J are diagrams of a gaming display showing a game progression of a gaming event according to embodiments of the invention.
Figure 11B:
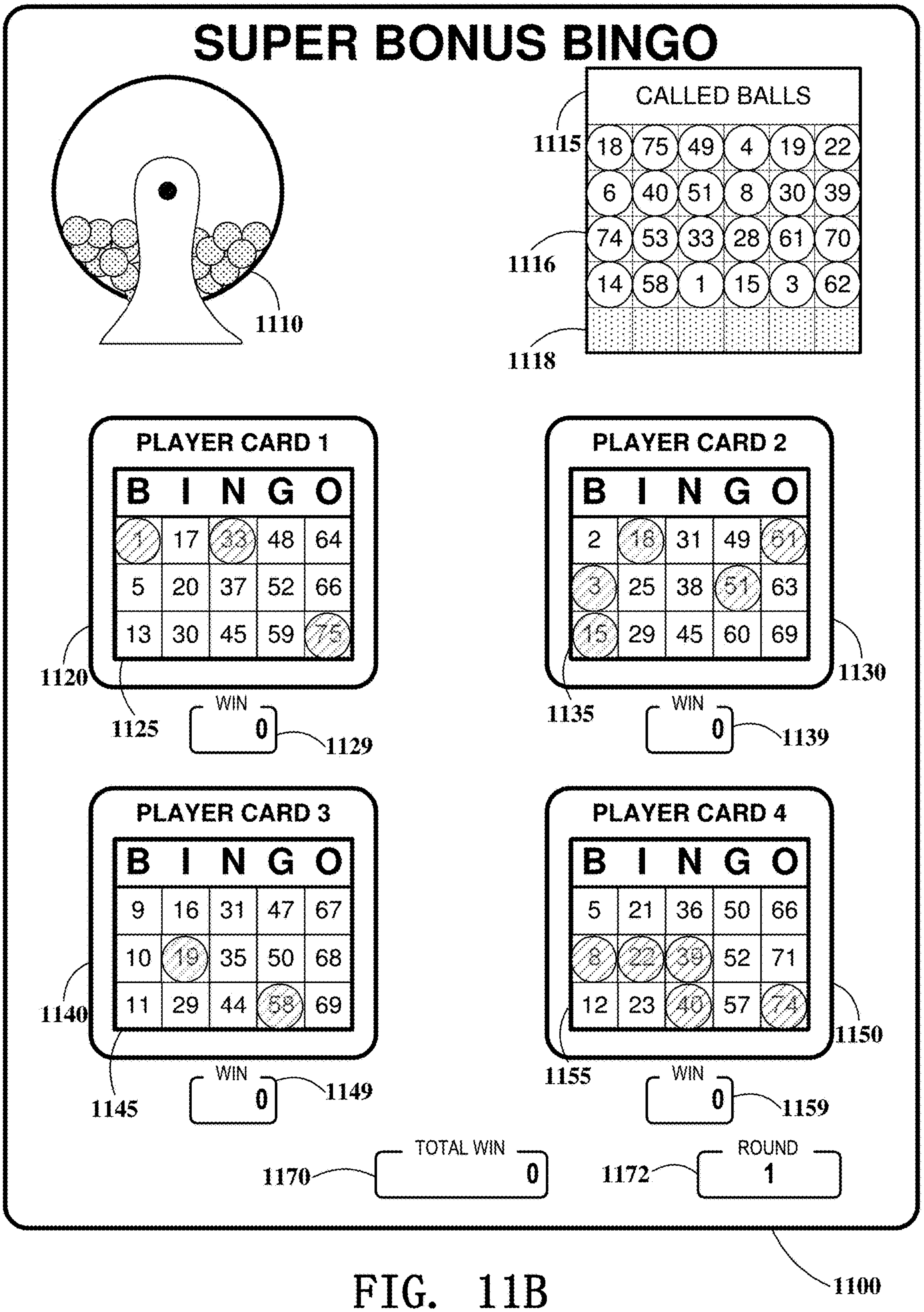

As shown in FIG. 11A, the gaming event is initiated and the player cards 1120, 1130, 1140, 1150 are shown with each grid position showing a number. These numbers in the grids 1125, 1135, 1145, 1155 may be randomly drawn or selected ahead of time by a player. The numbers may remain constant through each of the rounds of the gaming event, or new numbers may be selected for each different round. In FIG. 11B, an initial draw of twenty four balls are drawn from the hopper 1110 and placed in the initial draw portion 1116 of the Called Ball area 1115. Corresponding balls that match the initially drawn balls are marked on each of the player cards 1120, 1130, 1140, 1150, as shown. A complete row, column, or diagonal of matched numbers on one of the player cards 1120, 1130, 1140, 1150 is needed to progress to a next round of the gaming event. Each three number column or diagonal is worth 10 credits, and a completed row of five numbers is worth 50 credits. In this instance, the player has not received any "Bingos" of matched numbers in a column, row, or diagonal from the initial draw.

Figure 11C:
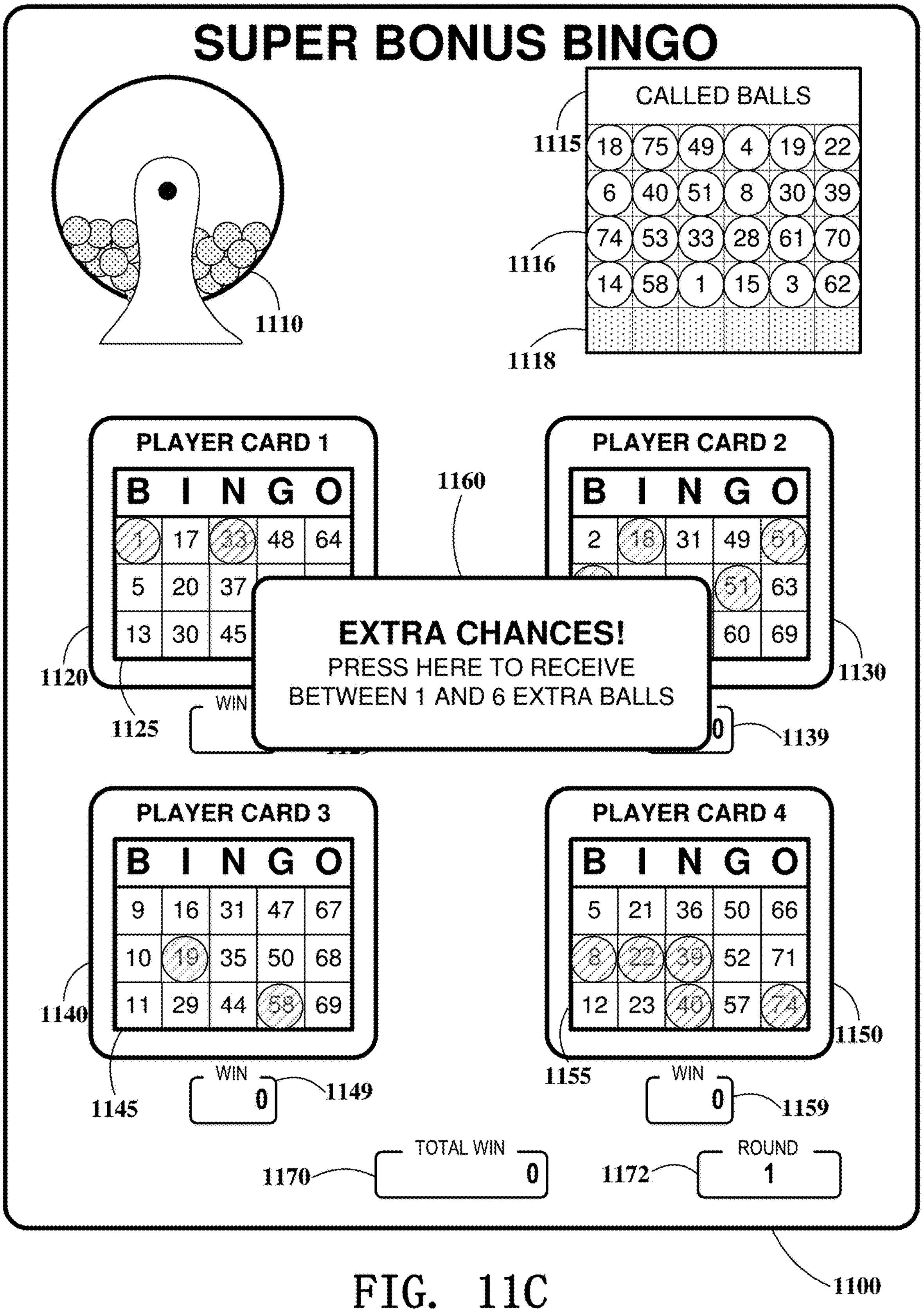
Figure 11D:
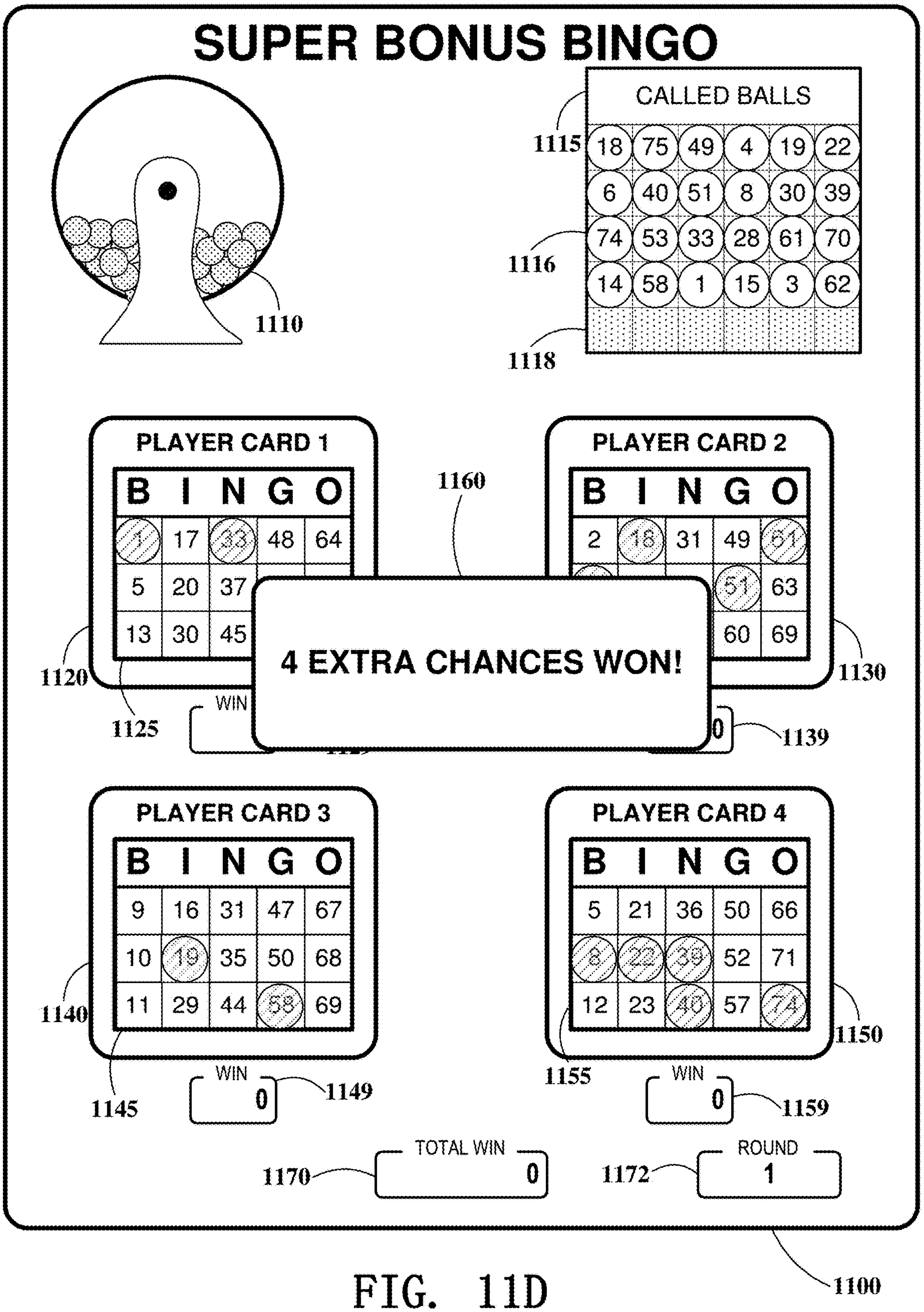
Figure 11E:
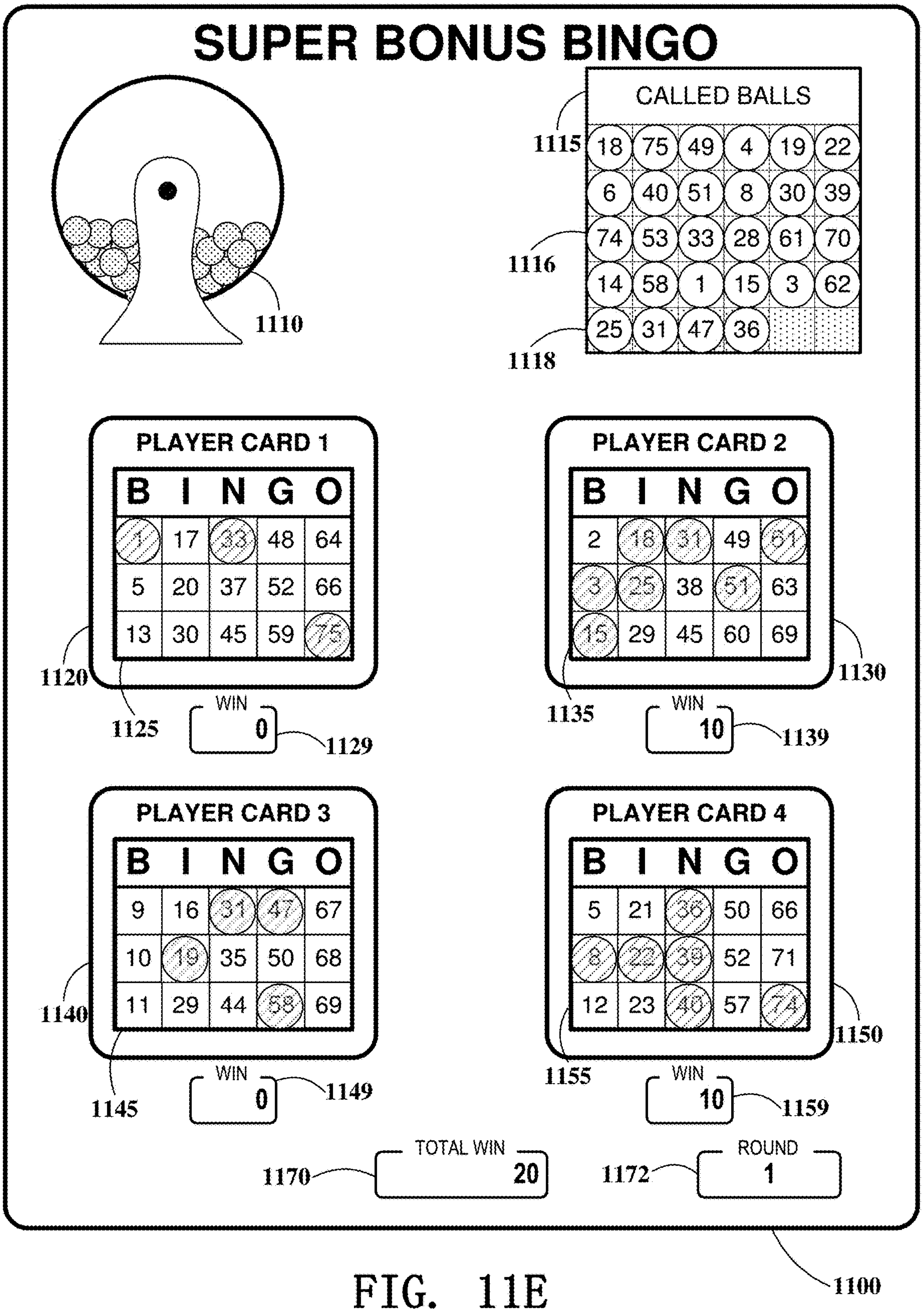

In FIG. 11C, a message box 1160 appears to inform the player that they will receive between one and six extra balls to match numbers on the player cards 1120, 1130, 1140, 1150. In this instance, the player is requested to press the message box 1160 to activate the secondary draw. However, in other embodiments, this secondary draw may happen automatically. In FIG. 11D, the message box 1160 informs the player that four extra balls will be drawn. In FIG. 11E, the four additional balls are drawn and placed in the secondary draw portion 1118 of the Called Ball area 1115. Here, the extra four balls have caused two "Bingos" on the second and fourth player cards 1130, 1150. Since each of these matched patterns of numbers are three-ball patterns, the player is awarded ten credits for each, as shown on the card win meters 1139, 1159. The Total Win meter is also updated to show the total amount currently won in the gaming event.

Figure 11F:
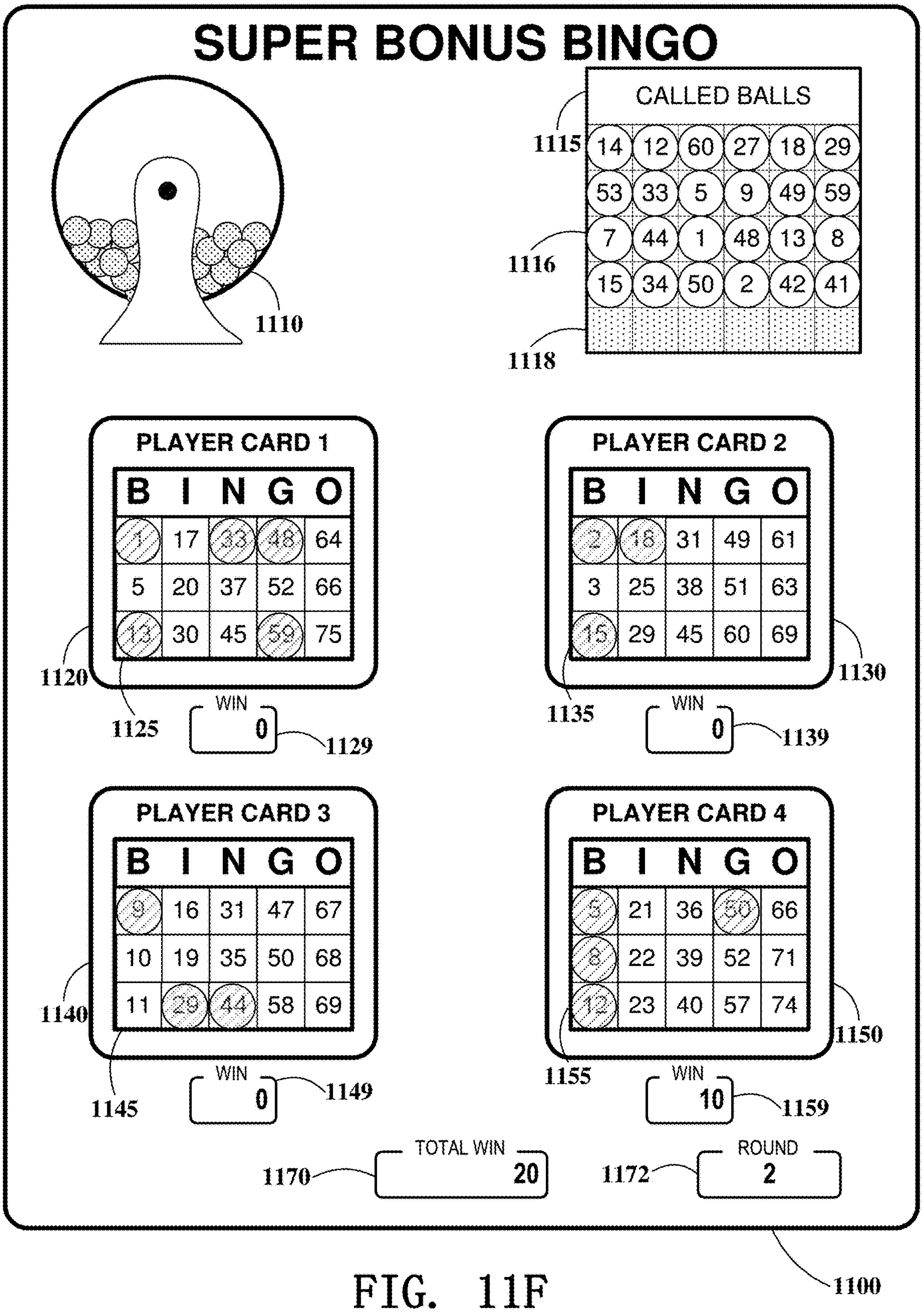
Figure 11G:
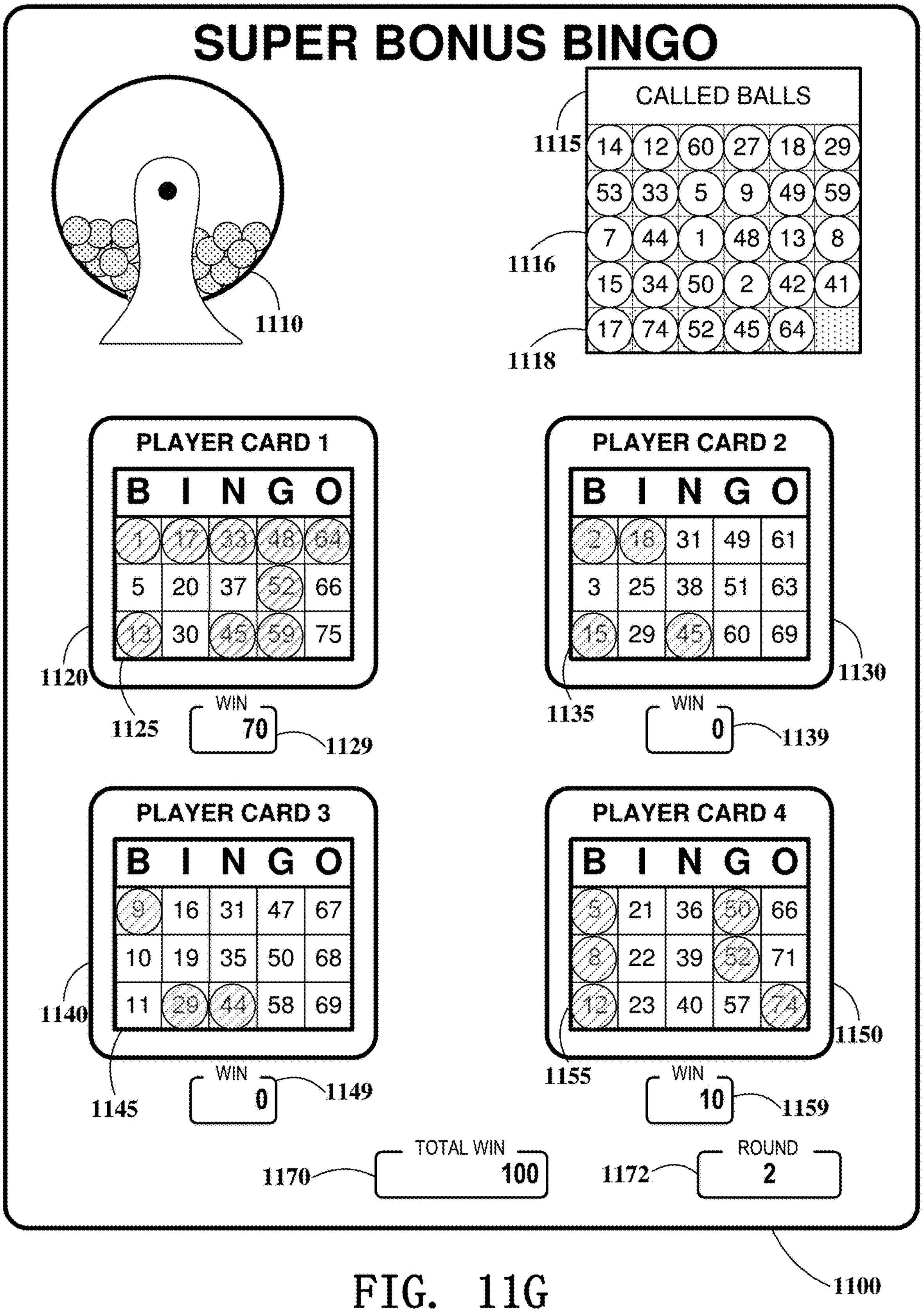

Referring to FIG. 11F, the second round of the gaming event is initiated, and twenty four numbers are again drawn at the initial draw. These numbers are shown in the primary draw portion 1116 of the Called Ball area 1115 and matching numbers on the player cards 1120, 1130, 1140, 1150 are marked. Here, a player has made a matched column "Bingo" on the fourth player card 1150 just from the initial draw. Thus, the player knows that they will progress to a third round of the gaming event even before the secondary balls have been drawn. The player can now root for specific balls to complete more "Bingo" patterns for larger awards. In FIG. 11G, a secondary draw of five balls is won, and the additional five balls are shown in the secondary draw portion 1118 of the Called Ball area 1115. Although not shown, the player may again be requested to press a button or otherwise activate the secondary draw. Here, the five additional balls have created a number of additional "Bingo" patterns including a matching row, column, and diagonal on the first player card. This brings the total won on the second round to 80 credits, which is added to the previously won credits on the Total Win meter 1170.

Figure 11H:
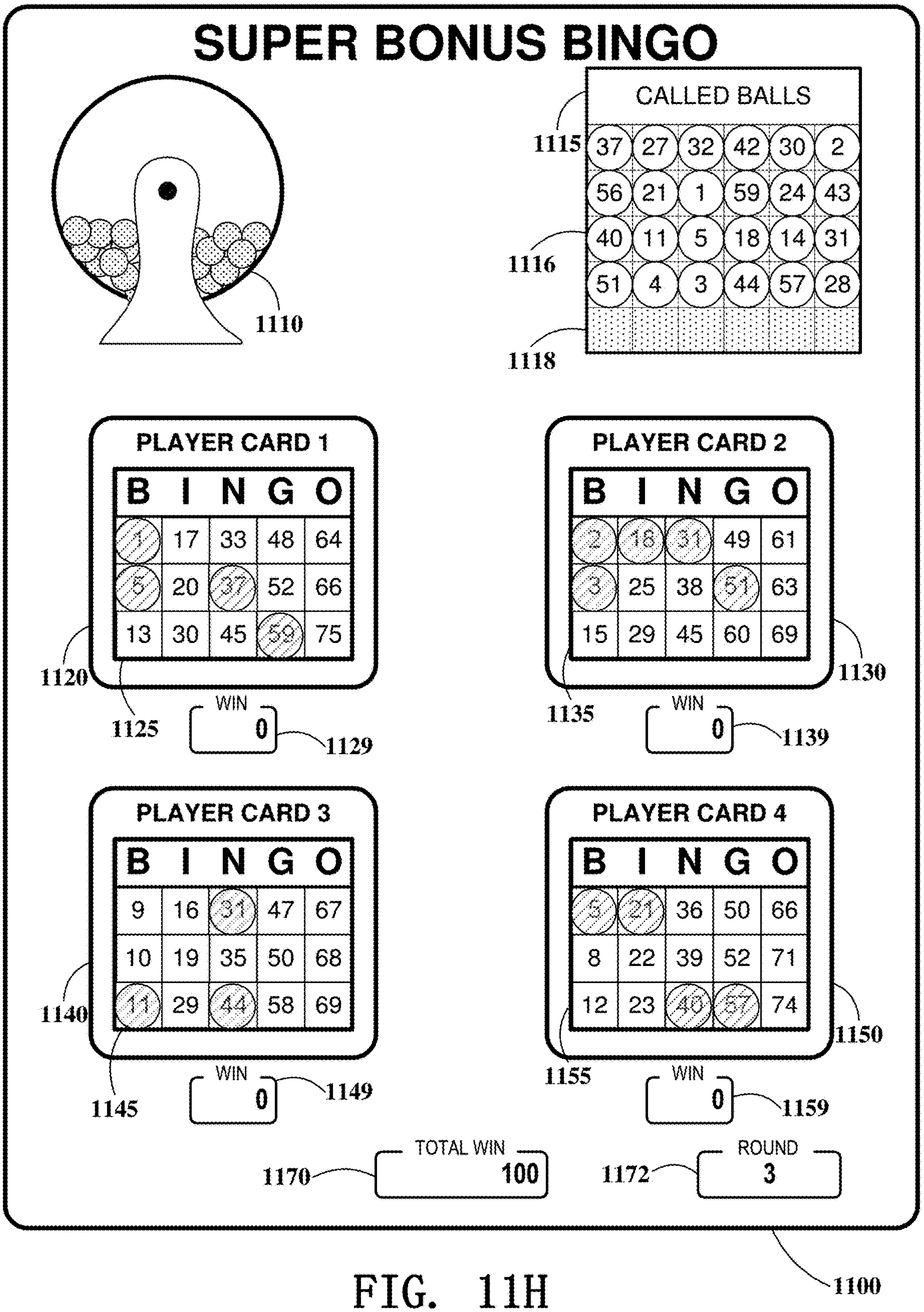
Figure 11I:
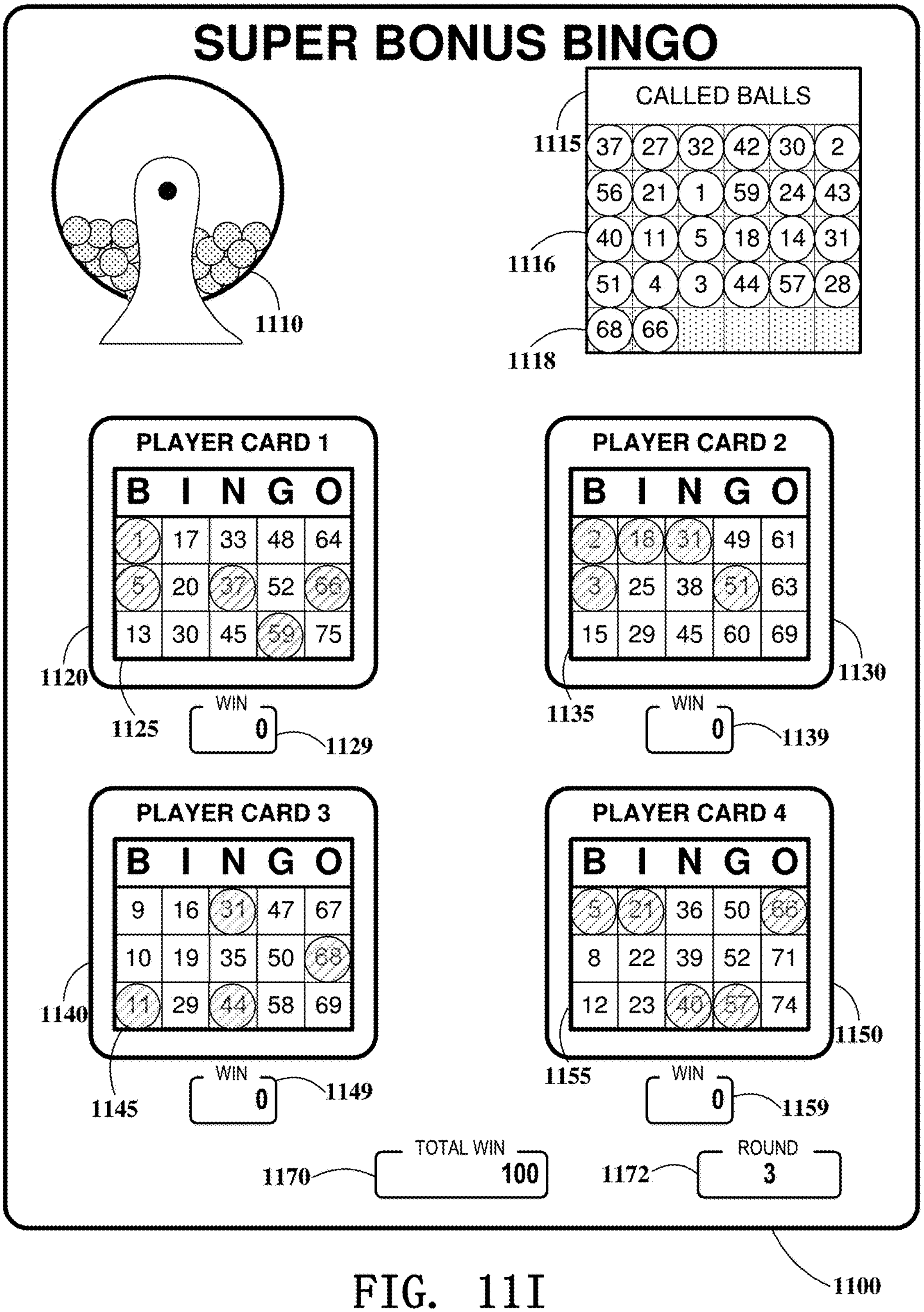
Figure 11J:
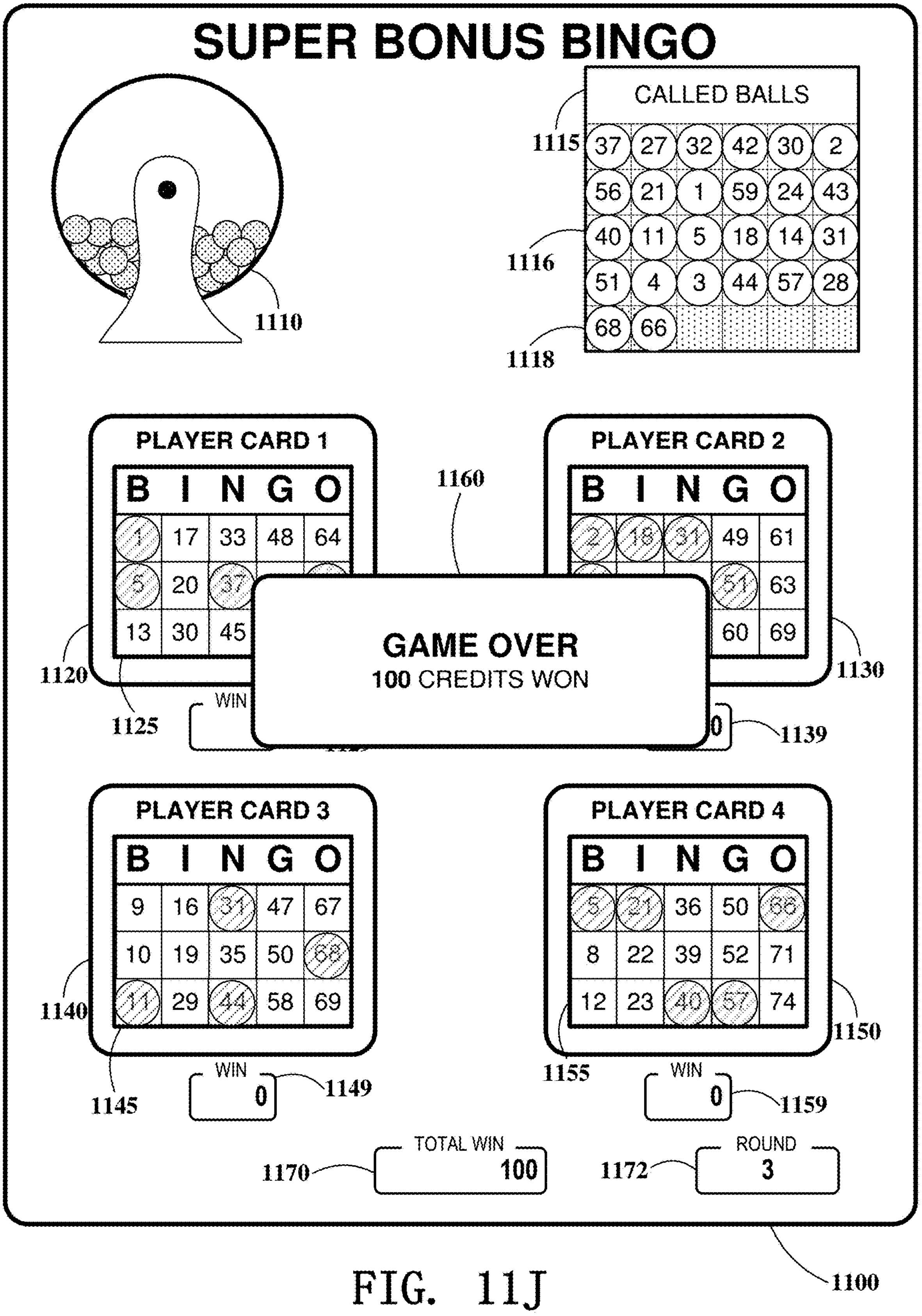

Referring to FIG. 11H, the third round of the gaming event is initiated, and twenty four numbers are again drawn at the initial draw. These numbers are shown in the primary draw portion 1116 of the Called Ball area 1115 and matching numbers on the player cards 1120, 1130, 1140, 1150 are marked. Here, the player has not made any "Bingo" patterns from the initial draw and must rely on the secondary draw to progress to a subsequent round of the gaming event. As shown in FIG. 11I, the player only received two additional balls in the secondary draw, and neither has resulted in a "Bingo" pattern on any of the four player cards 1120, 1130, 1140, 1150. Thus, as shown in FIG. 11J, the gaming event ends and the amount shown on the Total Win meter 1170 is awarded. In other embodiments, the player may receive a consolation prize if they do not progress to a next round. In some embodiments, this consolation prize may be reduced or be eliminated after the player makes it to a predetermined round of the gaming event.

Although four player cards 1120, 1130, 1140, 1150 are shown in this embodiment, more or fewer player cards may be used in other embodiments. The grids 1125, 1135, 1145, 1155 of these player cards 1120, 1130, 1140, 1150 are shown as 3×5 grids, but may be 5×5 grids or any sized grids in other embodiments. Additionally, although twenty four balls are initially drawn and between 1 and 6 are drawn in a secondary draw in this embodiment, more or fewer balls may be initially drawn and/or possible in a secondary draw. In some embodiments, a tertiary or additional draws may be made. In some embodiments, additional random or fixed draws may be "bought" by a player in the form of a side wager or other wager.

Figure 12:
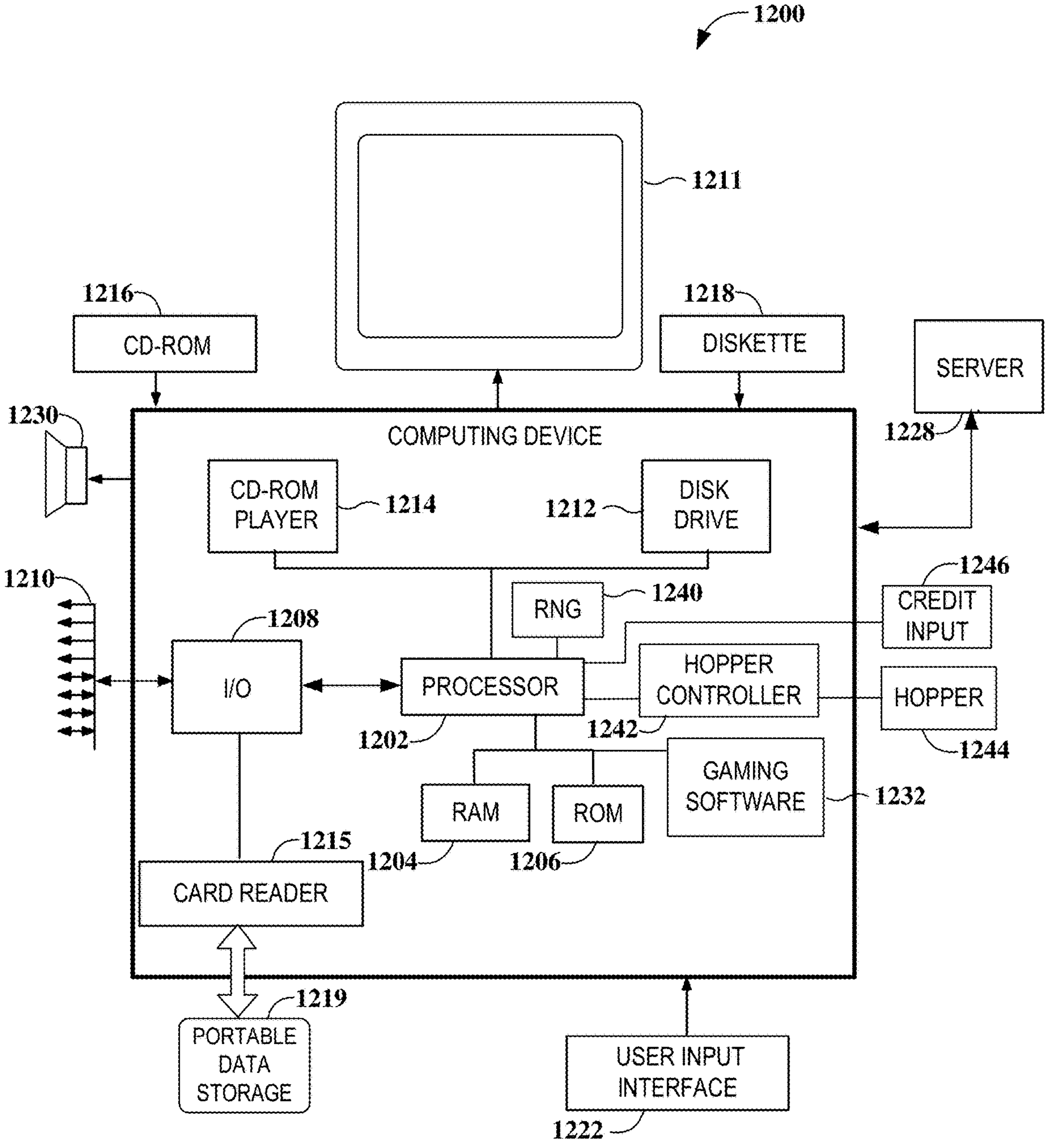
FIG. 12 is a block diagram illustrating a computing arrangement according to embodiments of the invention.

As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 12.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1200 of FIG. 12 is an example computing structure that can be used in connection with such electronic gaming machines, computers, or other computer-implemented devices to carry out operations of the present invention.

The example computing arrangement 1200 suitable for performing the gaming functions in accordance with the present invention typically includes a central processor (CPU) 1202 coupled to random access memory (RAM) 1204 and some variation of read-only memory (ROM) 1206. The ROM 1206 may also represent other types of storage media to store programs, such as programmable ROM (PROM), erasable PROM (EPROM), etc. The processor 1202 may communicate with other internal and external components through input/output (I/O) circuitry 1208 and bussing 1210, to provide control signals, communication signals, and the like.

The computing arrangement 1200 may also include one or more data storage devices, including hard and floppy disk drives 1212, CD-ROM drives 1214, card reader 1215, and other hardware capable of reading and/or storing information such as DVD, etc. In one embodiment, software for carrying out the operations in accordance with the present invention may be stored and distributed on a CD-ROM 1216, diskette 1218, access card 1219, or other form of computer readable media capable of portably storing information. These storage media may be inserted into, and read by, devices such as the CD-ROM drive 1214, the disk drive 1212, card reader 1215, etc. The software may also be transmitted to the computing arrangement 1200 via data signals, such as being downloaded electronically via a network, such as the Internet. Further, as previously described, the software for carrying out the functions associated with the present invention may alternatively be stored in internal memory/storage of the computing device 1200, such as in the ROM 1206.

The computing arrangement 1200 is coupled to the display 1211, which represents a display on which the gaming activities in accordance with the invention are presented. The display 1211 represents the "presentation" of the video information in accordance with the invention, and may be any type of known display or presentation screen, such as liquid crystal displays, plasma displays, cathode ray tubes (CRT), digital light processing (DLP) displays, liquid crystal on silicon (LCOS) displays, etc.

Where the computing device 1200 represents a stand-alone or networked computer, the display 1211 may represent a standard computer terminal or display capable of displaying multiple windows, frames, etc. Where the computing device is embedded within an electronic gaming machine, the display 1211 corresponds to the display screen of the gaming machine/kiosk. A user input interface 1222 such as a mouse, keyboard/keypad, microphone, touch pad, trackball, joystick, touch screen, voice-recognition system, etc. may be provided. The display 1211 may also act as a user input device, e.g., where the display 1211 is a touch-screen device.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs as known in the art may be implemented using hardware, software operable in connection with the processor 1202, or some combination of hardware and software. The present invention is operable using any known RNG, and may be integrally programmed as part of the processor 1202 operation, or alternatively may be a separate RNG controller 1240. The RNGs are often protected by one or more security measures to prevent tampering, such as by using secured circuitry, locks on the physical game cabinet, and/or remote circuitry that transmits data to the gaming device.

The computing arrangement 1200 may be connected to other computing devices or gaming machines, such as via a network. The computing arrangement 1200 may be connected to a network server 1228 in an intranet or local network configuration. The computer may further be part of a larger network configuration as in a global area network (GAN) such as the Internet. In such a case, the computer may have access to one or more web servers via the Internet. In other arrangements, the computing arrangement 1200 may be configured as an Internet server and software for carrying out the operations in accordance with the present invention may interact with the player via one or more networks.

Other components directed to gaming machine implementations include manners of gaming participant payment, and gaming machine payout. For example, a gaming machine including the computing arrangement 1200 may also include a hopper controller 1242 to determine the amount of payout to be provided to the participant. The hopper controller may be integrally implemented with the processor 1202, or alternatively as a separate hopper controller 1242. A hopper 1244 may also be provided in gaming machine embodiments, where the hopper serves as the mechanism holding the coins/tokens of the machine. The wager input module 1246 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 1232 may be able to control payouts via the hopper 1244 and controller 1242 for independently determined payout events.

Among other functions, the computing arrangement 1200 provides an interactive experience to players via input interface 1222 and output devices, such as the display 1211, speaker 1230, etc. These experiences are generally controlled by gaming software 1232 that controls a primary gaming activity of the computing arrangement 1200. The gaming software 1232 may be temporarily loaded into RAM 1204, and may be stored locally using any combination of ROM 1206, drives 1212, media player 1214, or other computer-readable storage media known in the art. The primary gaming software 1232 may also be accessed remotely, such as via the server 1228 or the Internet.

The primary gaming software 1232 in the computing arrangement 1200 is shown here as an application software module. According to embodiments of the present invention, this software 1232 provides a slot game or similar game of chance as described hereinabove. For example, the software 1232 may present, by way of the display 1211, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 1232 may include instructions to provide other functionality as known in the art and described herein, such as shown and described above regarding FIGS. 1-11J.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A gaming device comprising:

a video display device configured to display a game grid and a drawn symbol display;

a player interface including at least one button, the button configured to generate a signal in response to being activated by a player;

a wager input device structured to receive physical items associated with currency values;

a memory configured to store a credit amount, a plurality of game symbols, and a plurality of game reels each having a respective sequence of the game symbols associated therewith; and a processor operable to:

receive a signal from the wager input device, the signal indicating receipt of a physical item associated with a currency value;

increase the credit amount stored in the memory based on the currency value associated with the received physical item;

receive a signal to initiate a primary game event, where an amount wagered on the primary game event is deducted from the credit amount stored in the memory;

display the primary game event by spinning the plurality of game reels through the game grid and stopping the plurality of game reels to show a primary game outcome for the primary game event, the primary game outcome including a first combination of game symbols in the game grid;

initiate a bonus game event when a bonus trigger condition is satisfied during the primary game event, the bonus game event including:

(a) randomly selecting a symbol from the plurality of game symbols to display in the drawn symbol display, (b) associating an award value with the selected game symbol displayed in the drawn symbol display, (c) marking any displayed game symbols in the game grid that match the selected game symbol displayed in the drawn symbol display, (d) incrementing a win meter associated with the game grid by the award values associated with game symbols displayed in the first game grid that match the selected game symbol displayed in the drawn symbol display, (e) determining if a bonus ending condition is satisfied, and (g) repeating processes (a)-(e) until a bonus ending condition is satisfied;

provide any awards based on the primary game event and based on the bonus game event, the awards increasing the credit amount stored in the memory.

2. The gaming device of claim 1, wherein the award based on the bonus game event is a final award value of the win meter associated with the game grid.

3. The gaming device of claim 1, wherein the bonus ending condition is satisfied when the marked game symbols in the game grid complete a predetermined pattern of markings.

4. The gaming device of claim 3, wherein the predetermined pattern of markings includes patterns that show markings across either a full row in the first game grid or the second game grid, a full column in the first game grid or the second game grid, or a full corner-to-corner diagonal in the game grid.

5. The gaming device of claim 1, wherein the plurality of game symbols includes one or more special symbols that are not included in the sequence of the game symbols respectively associated with the plurality of game reels, but that may be randomly selected during the bonus game event.

6. The gaming device of claim 5, wherein the plurality of game symbols includes a bonus ending symbol, and wherein the bonus ending condition is satisfied when the bonus ending symbol is randomly selected during the bonus game event.

7. The gaming device of claim 5, wherein the plurality of game symbols includes a multiplier symbol, and wherein the award value of the multiplier symbol is used to multiply the bonus award based on the bonus game event.

8. A gaming device comprising:

a video display device configured to display a game grid and a drawn symbol display;

a player interface including at least one button, the button configured to generate a signal in response to being activated by a player;

a wager input device structured to receive physical items associated with currency values;

a memory configured to store a credit amount, a plurality of game symbols, and a plurality of game reels each having a respective sequence of the game symbols associated therewith; and a processor operable to:

receive a signal from the wager input device, the signal indicating receipt of a physical item associated with a currency value;

increase the credit amount stored in the memory based on the currency value associated with the received physical item;

receive a signal to initiate a primary game event, where an amount wagered on the primary game event is deducted from the credit amount stored in the memory;

display the primary game event by spinning the plurality of game reels through the game grid and stopping the plurality of game reels to show a primary game outcome for the primary game event, the primary game outcome including a first combination of game symbols in the game grid;

initiate a bonus game event when a bonus trigger condition is satisfied during the primary game event, the bonus game event including:

(a) randomly selecting a symbol from the plurality of game symbols, (b) randomly selecting an award value to associate with the selected symbol, (c) displaying the randomly selected symbol in the drawn symbol display along with the associated award value, (d) marking any displayed game symbols in the game grid that match the selected symbol displayed in the drawn symbol display, (e) incrementing a win meter displayed on the video display by the award values associated with any game symbols displayed in the first game grid that match the selected symbol displayed in the drawn symbol display, (f) determining if a bonus ending condition is satisfied, and (g) repeating processes (a)-(f) until the bonus ending condition is satisfied;

provide any awards based on the primary game event and based on the bonus game event, the awards increasing the credit amount stored in the memory.

9. The gaming device of claim 8, wherein the award based on the bonus game event is a final award value of the win meter.

10. The gaming device of claim 8, wherein the bonus ending condition is satisfied when the marked game symbols in the game grid complete a predetermined pattern of markings.

11. The gaming device of claim 10, wherein the predetermined pattern of markings includes patterns that show markings across either a full row in the first game grid or the second game grid, a full column in the first game grid or the second game grid, or a full corner-to-corner diagonal in the game grid.

12. The gaming device of claim 8, wherein the plurality of game symbols includes one or more special symbols that are not included in the sequence of the game symbols respectively associated with the plurality of game reels, but that may be randomly selected during the bonus game event.

13. The gaming device of claim 12, wherein the plurality of game symbols includes a bonus ending symbol, and wherein the bonus ending condition is satisfied when the bonus ending symbol is randomly selected during the bonus game event.

14. The gaming device of claim 12, wherein the plurality of game symbols includes a multiplier symbol, and wherein an award value of the multiplier symbol is used to multiply any awards based on the bonus game event.

15. The gaming device of claim 12, wherein the plurality of game symbols includes a multiplier symbol, and wherein an award value of the multiplier symbol is used to multiply any awards based on the primary game event.

16. The gaming device of claim 12, wherein the plurality of game symbols includes a multiplier symbol, and wherein an award value of the multiplier symbol is used to multiply any combined awards based on both the primary game event and based on the bonus game event.

17. The gaming device of claim 8, wherein the drawn symbol display is only shown on the video display device when bonus game event is initiated.

* * * * *